US012652123B2

(12) United States Patent
Jeon et al.

(10) Patent No.: US 12,652,123 B2
(45) Date of Patent: Jun. 9, 2026

(54) METHOD FOR PERFORMING FEDERATED LEARNING IN WIRELESS COMMUNICATION SYSTEM, AND APPARATUS THEREFOR

(71) Applicant: LG Electronics Inc., Seoul (KR)

(72) Inventors: Kijun Jeon, Seoul (KR); Sangrim Lee, Seoul (KR); Hojae Lee, Seoul (KR); Yeongjun Kim, Seoul (KR); Taehyun Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 324 days.

(21) Appl. No.: 18/573,914

(22) PCT Filed: Jun. 23, 2021

(86) PCT No.: PCT/KR2021/007899
§ 371 (c)(1),
(2) Date: Dec. 22, 2023

(87) PCT Pub. No.: WO2022/270650
PCT Pub. Date: Dec. 29, 2022

(65) Prior Publication Data
US 2024/0322941 A1     Sep. 26, 2024

(51) Int. Cl.
H04L 1/00          (2006.01)
(52) U.S. Cl.
CPC .......... H04L 1/0041 (2013.01); H04L 1/0061 (2013.01)
(58) Field of Classification Search
None
See application file for complete search history.

(56) References Cited

U.S. PATENT DOCUMENTS

2019/0132708 A1*    5/2019   Belghoul ............ H04L 12/1845
2020/0259896 A1*    8/2020   Sachs ................. H04L 63/0428
(Continued)

FOREIGN PATENT DOCUMENTS

WO     WO 2021/108796      6/2021
WO     WO 2021/111456      6/2021

OTHER PUBLICATIONS

Qin et al., "Federated Learning and Wireless Communications," CoRR, submitted on May 11, 2020, arXiv:2005.05265v1, 7 pages.
(Continued)

*Primary Examiner* — Faiyazkhan Ghafoerkhan
(74) *Attorney, Agent, or Firm* — Fish & Richardson P.C.

(57)          ABSTRACT

The present disclosure provides a method for performing federated learning by one user equipment (UE) with a plurality of user equipments (UEs) in a wireless communication system. More specifically, the method performed by one UE comprises receiving, from a base station, restriction information related to an order restriction for an information field for generating a local parameter transmitted by the one UE to perform the federated learning; performing encoding on the local parameter generated from an order restricted information field based on the restriction information, wherein the encoded local parameter consists of a systematic bit part and a parity part; performing modulation on the encoded local parameter, wherein the modulation is performed in different ways for each of the systematic bit part and the parity part; and transmitting, to the base station, a signal including the modulated local parameters.

16 Claims, 21 Drawing Sheets

(56) References Cited

U.S. PATENT DOCUMENTS

| | | | | |
|---|---|---|---|---|
| 2020/0348662 A1* | 11/2020 | Cella | G05B 23/0294 | |
| 2020/0374662 A1* | 11/2020 | Belghoul | H04W 4/029 | |
| 2021/0157312 A1* | 5/2021 | Cella | G06Q 30/06 | |
| 2021/0211733 A1* | 7/2021 | Aksu | H04N 19/70 | |
| 2021/0319135 A1* | 10/2021 | Hwang | G06T 11/00 | |
| 2022/0083046 A1* | 3/2022 | Cella | G05B 23/0294 | |
| 2022/0083047 A1* | 3/2022 | Cella | G05B 23/0294 | |
| 2022/0083048 A1* | 3/2022 | Cella | G05B 23/0294 | |
| 2022/0108262 A1* | 4/2022 | Cella | G05B 17/02 | |
| 2022/0163959 A1* | 5/2022 | Cella | G06Q 30/06 | |
| 2022/0163960 A1* | 5/2022 | Cella | G06Q 30/06 | |
| 2022/0167211 A1* | 5/2022 | Sharma | H04L 12/4641 | |
| 2022/0210111 A1* | 6/2022 | Greenberg | H04L 67/12 | |
| 2022/0222379 A1* | 7/2022 | Hwang | G06F 21/53 | |
| 2022/0222380 A1* | 7/2022 | Hwang | G06F 21/6263 | |
| 2022/0240263 A1* | 7/2022 | Garg | H04B 17/3913 | |
| 2022/0256631 A1* | 8/2022 | Jain | H04W 76/15 | |
| 2022/0394492 A1* | 12/2022 | Chaugule | H04W 16/14 | |
| 2023/0089205 A1* | 3/2023 | Cella | G06Q 30/06 | |
| | | | 702/188 | |
| 2023/0092066 A1* | 3/2023 | Cella | G06Q 30/06 | |
| | | | 702/188 | |
| 2023/0098519 A1* | 3/2023 | Cella | G06Q 30/06 | |
| | | | 702/188 | |
| 2023/0111071 A1* | 4/2023 | Cella | G06Q 30/06 | |
| | | | 702/188 | |
| 2023/0135882 A1* | 5/2023 | Cella | G06Q 30/06 | |
| | | | 702/188 | |
| 2023/0164106 A1* | 5/2023 | Greenberg | H04L 51/10 | |
| | | | 709/207 | |
| 2023/0209390 A1* | 6/2023 | Zeng | H04W 24/02 | |
| 2023/0376634 A1* | 11/2023 | Hwang | G06F 21/53 | |
| 2024/0121447 A1* | 4/2024 | Metzler | H04N 19/11 | |
| 2024/0322941 A1* | 9/2024 | Jeon | G06N 3/04 | |

OTHER PUBLICATIONS

Wang et al., "When Edge Meets Learning: Adaptive Control for Resource-Constrained Distributed Machine Learning," CoRR, submitted on Apr. 14, 2018, arXiv:1804.05271v1, 15 pages.

Yoon et al., "Federated Continual Learning with Adaptive Parameter Communication," CoRR, submitted on Mar. 6, 2020, arXiv:2003.03196v1, 14 pages.

* cited by examiner

[FIG. 1]

[FIG. 2]
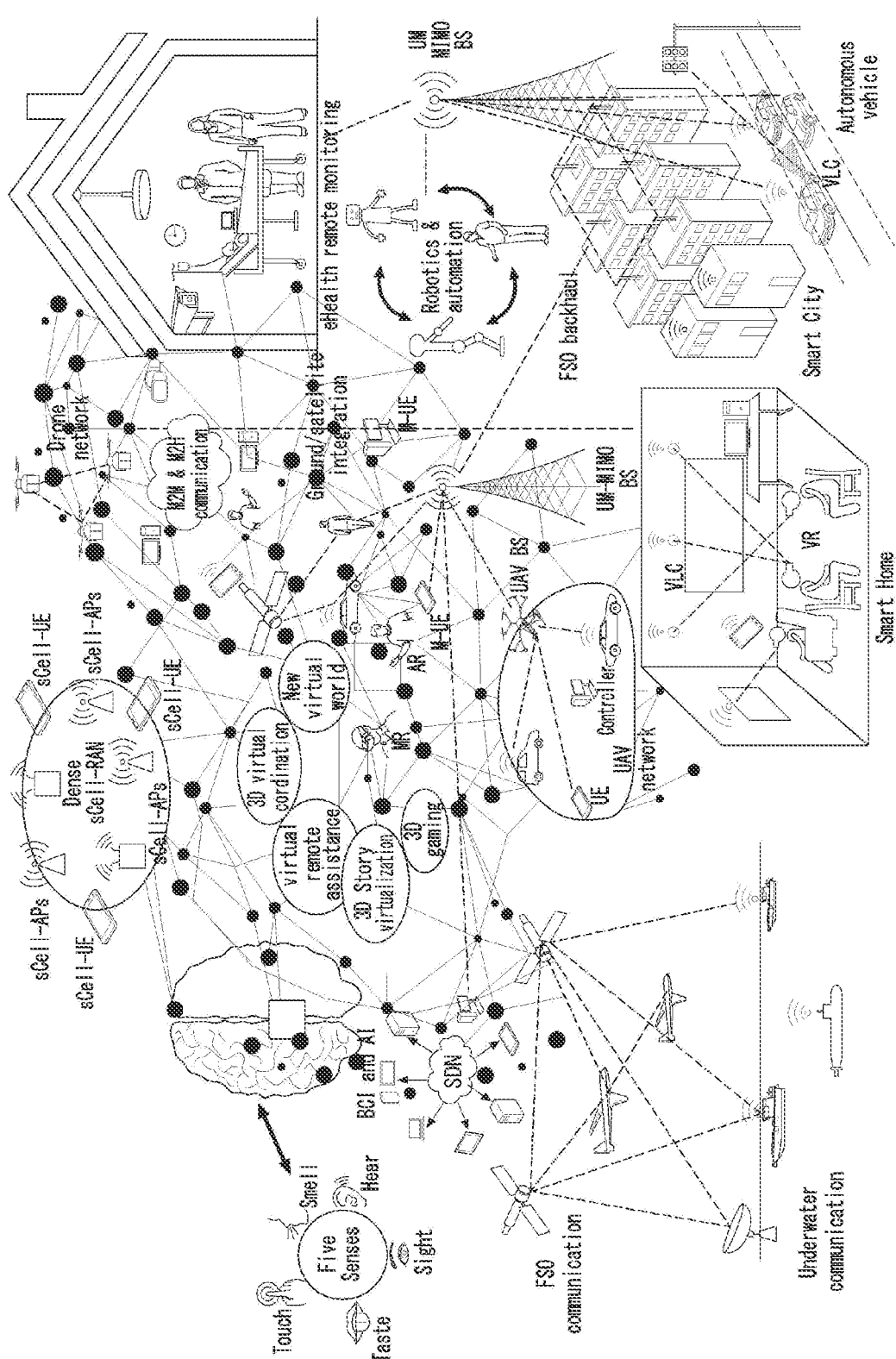

【FIG. 3】
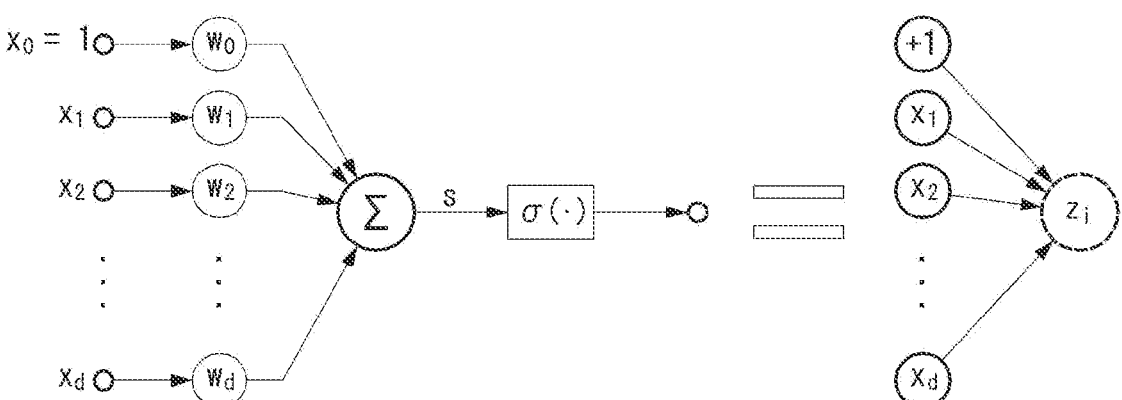
【FIG. 4】
Input layer     Hidden layer     Output layer
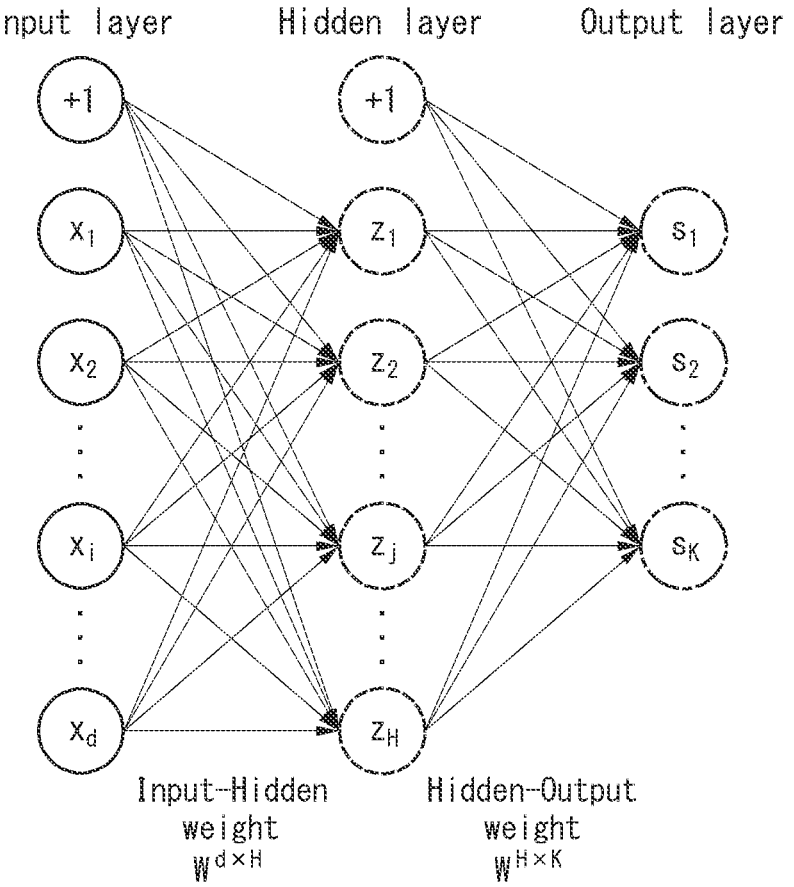
Input-Hidden
weight
$W^{d \times H}$
Hidden-Output
weight
$W^{H \times K}$

[FIG. 5]
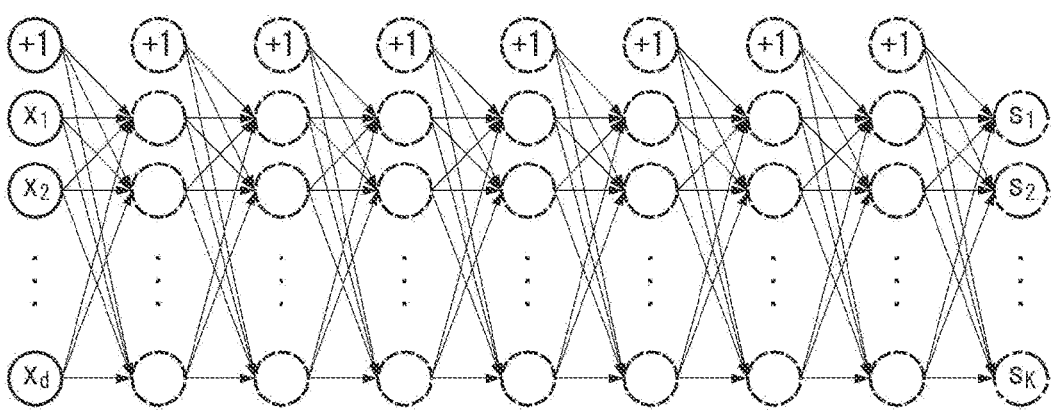
[FIG. 6]
Input layer          Hidden layer          Output layer
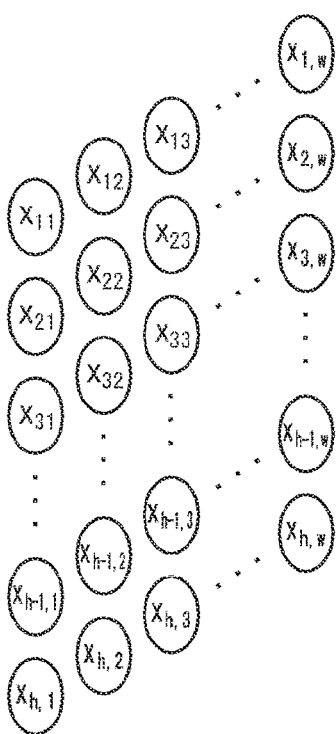 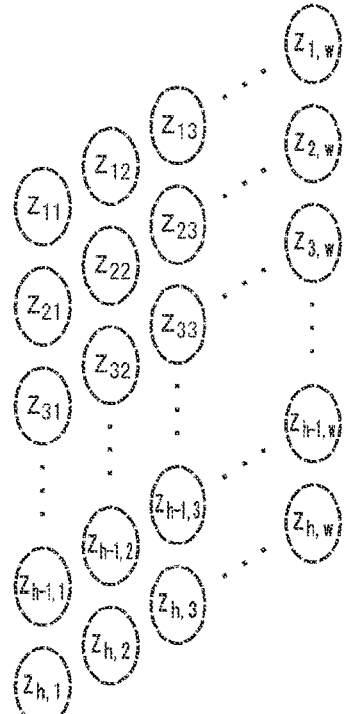 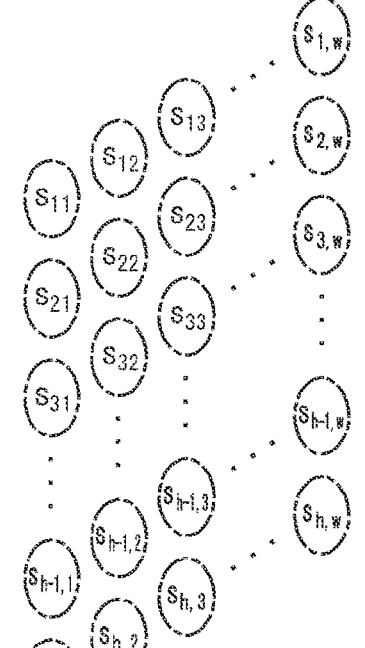
Input-Hidden         Hidden-Output
weight              weight
$W^{h \times w \times h \times w}$         $W^{h \times w \times h \times w}$ 【FIG. 7】
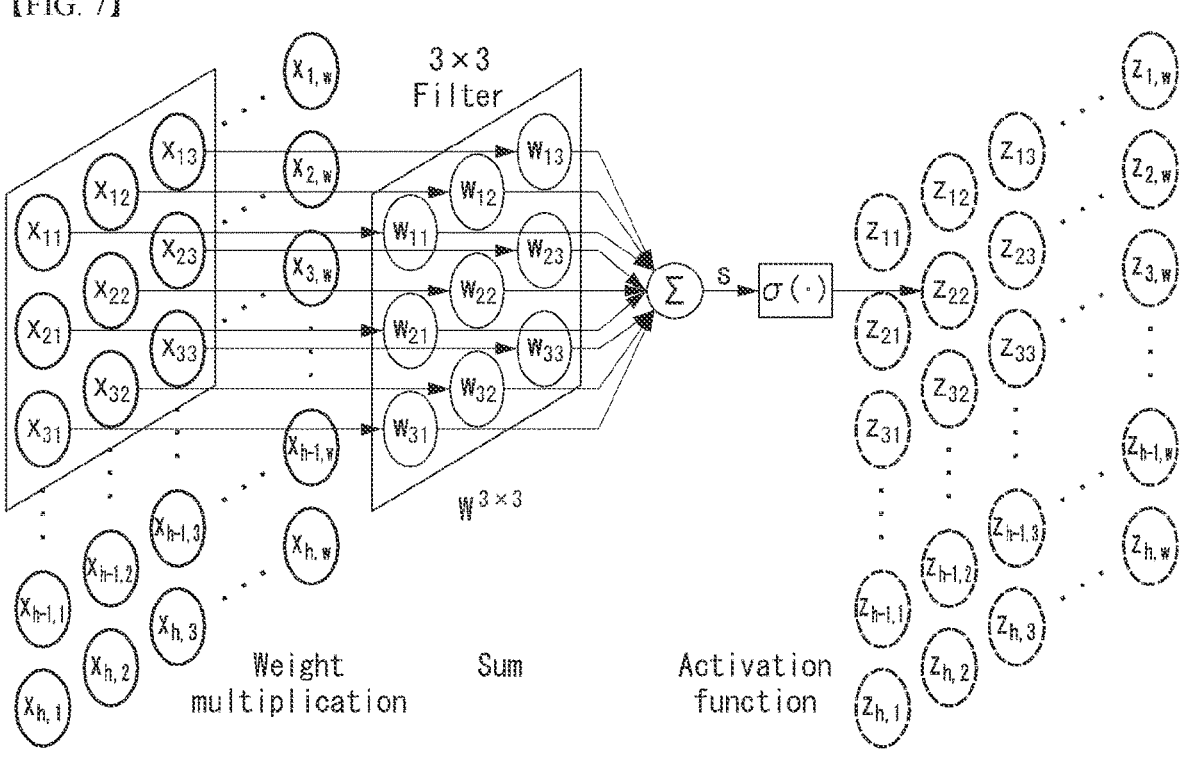
【FIG. 8】
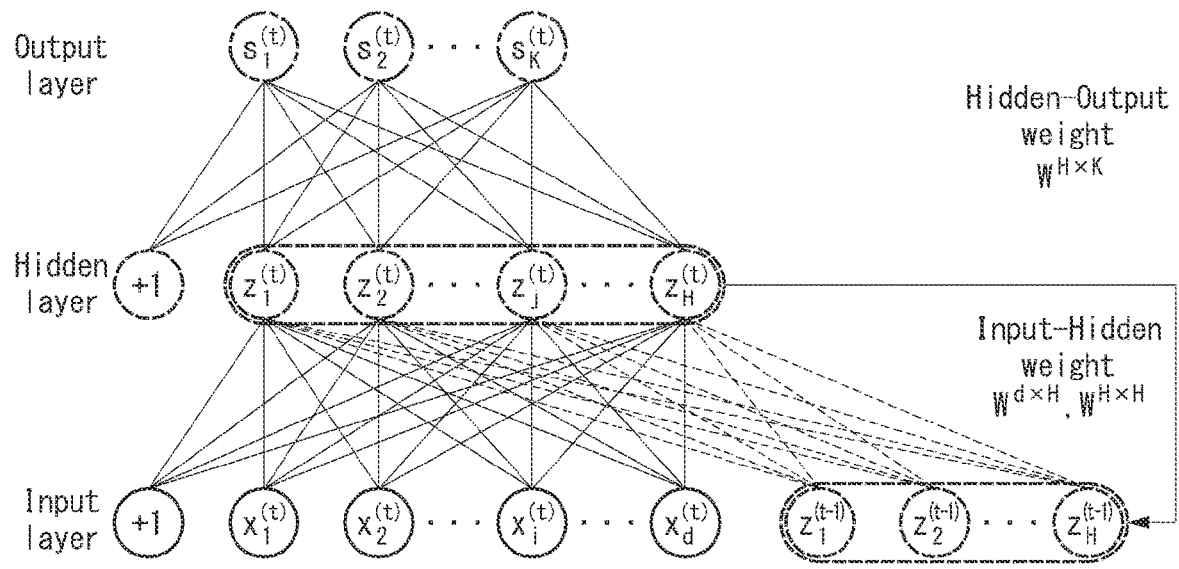

[FIG. 9]
| Time point | Input sequence |
|---|---|
| 1 | $(x_1^{(1)}, x_2^{(1)} \cdots, x_p^{(1)})$ |
| 2 | $(x_1^{(2)}, x_2^{(2)} \cdots, x_p^{(2)})$ |
| 3 | $(x_1^{(3)}, x_2^{(3)} \cdots, x_p^{(3)})$ |
| $t$ | $(x_1^{(t)}, x_2^{(t)} \cdots, x_p^{(t)})$ |
| T | $(x_1^{(T)}, x_2^{(T)} \cdots, x_p^{(T)})$ |
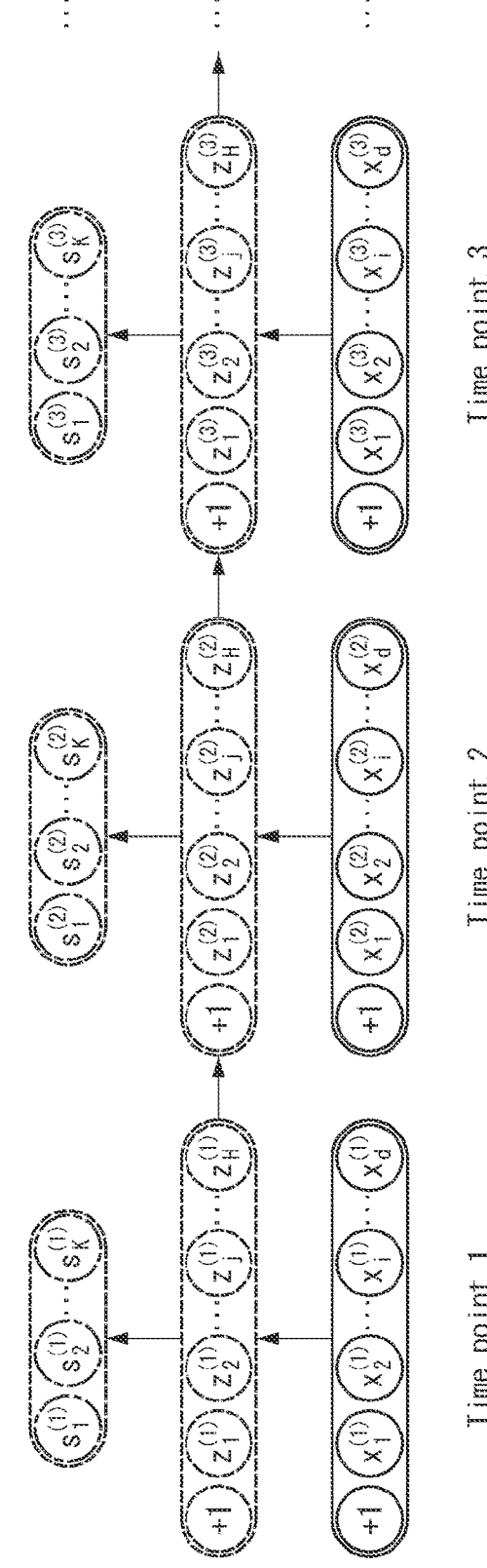

【FIG. 10】
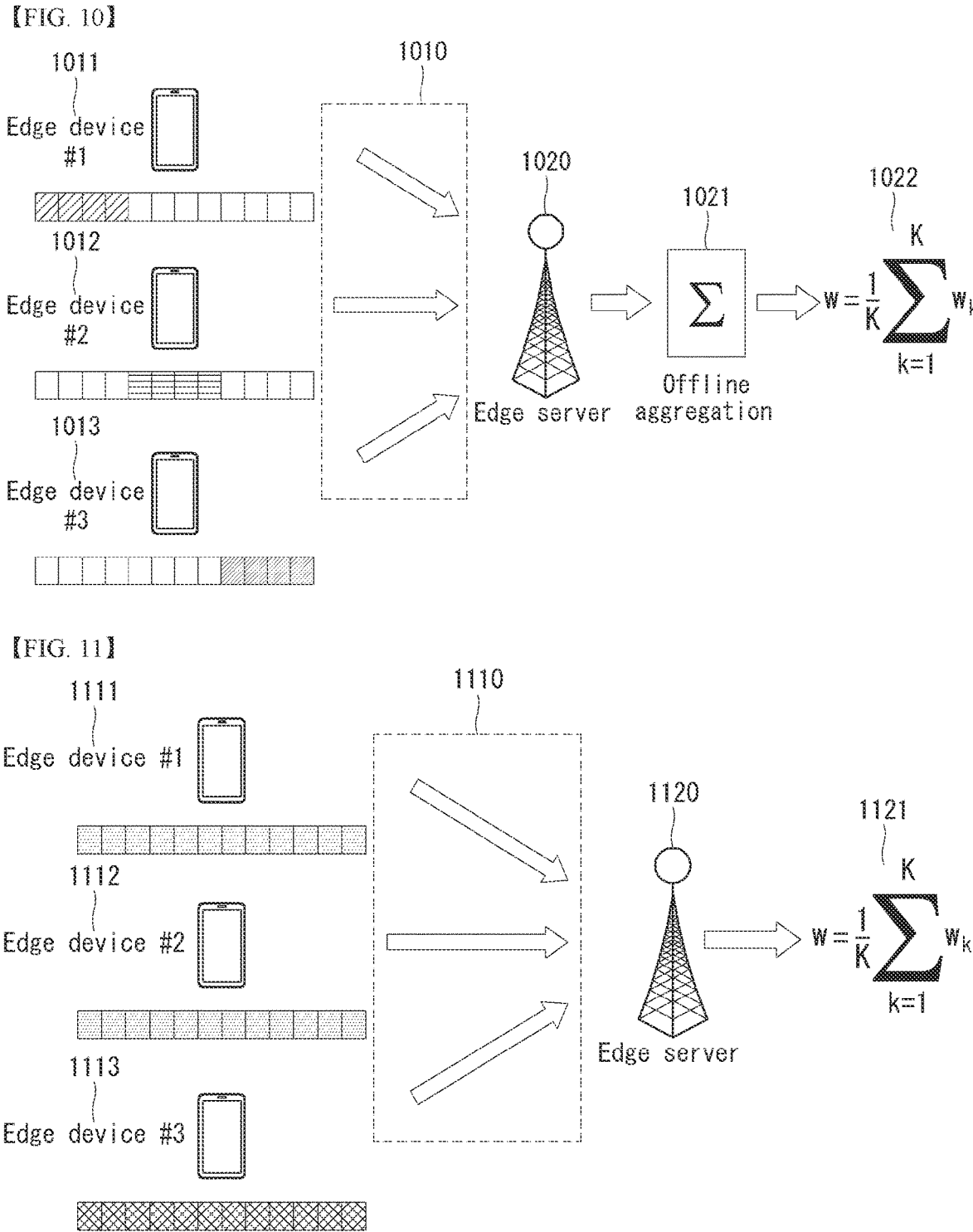
【FIG. 11】

[FIG. 12]
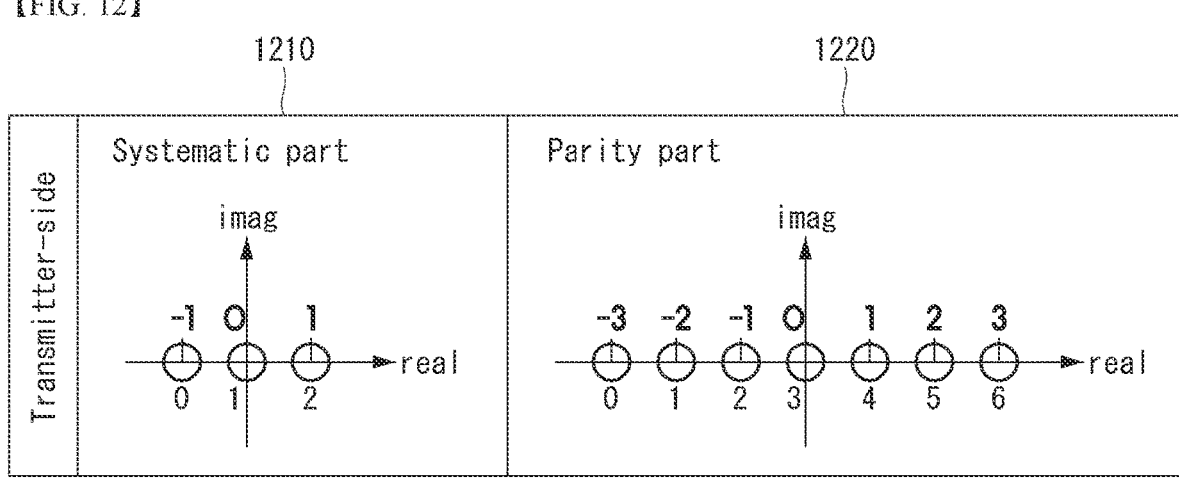

[FIG. 13]
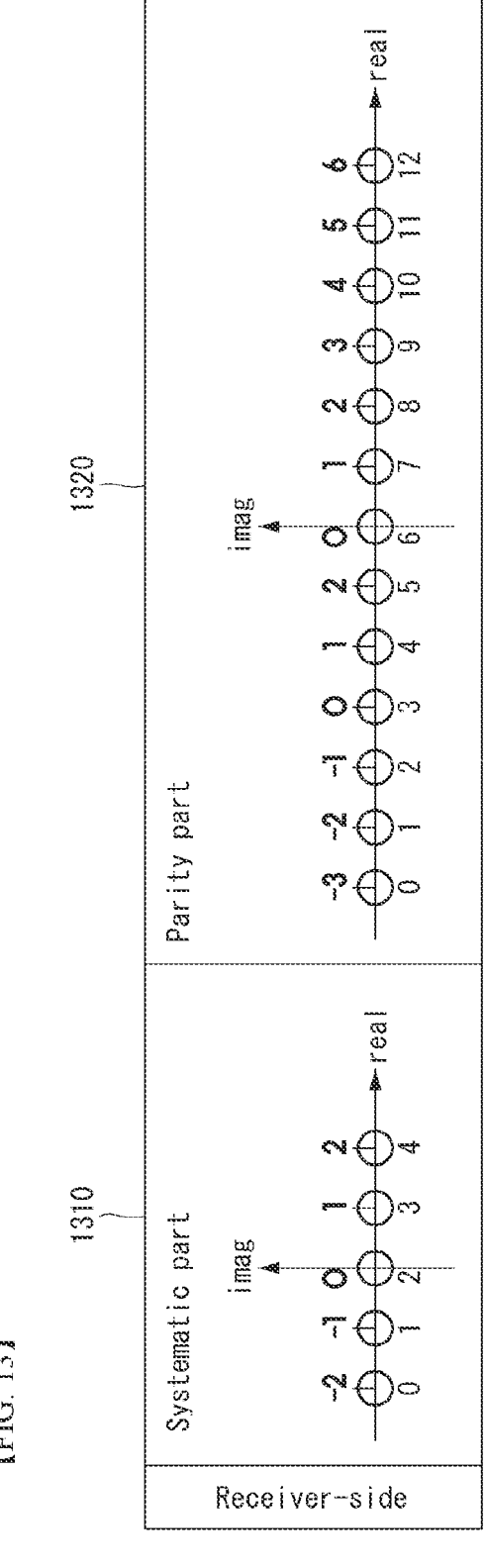

[FIG. 14]
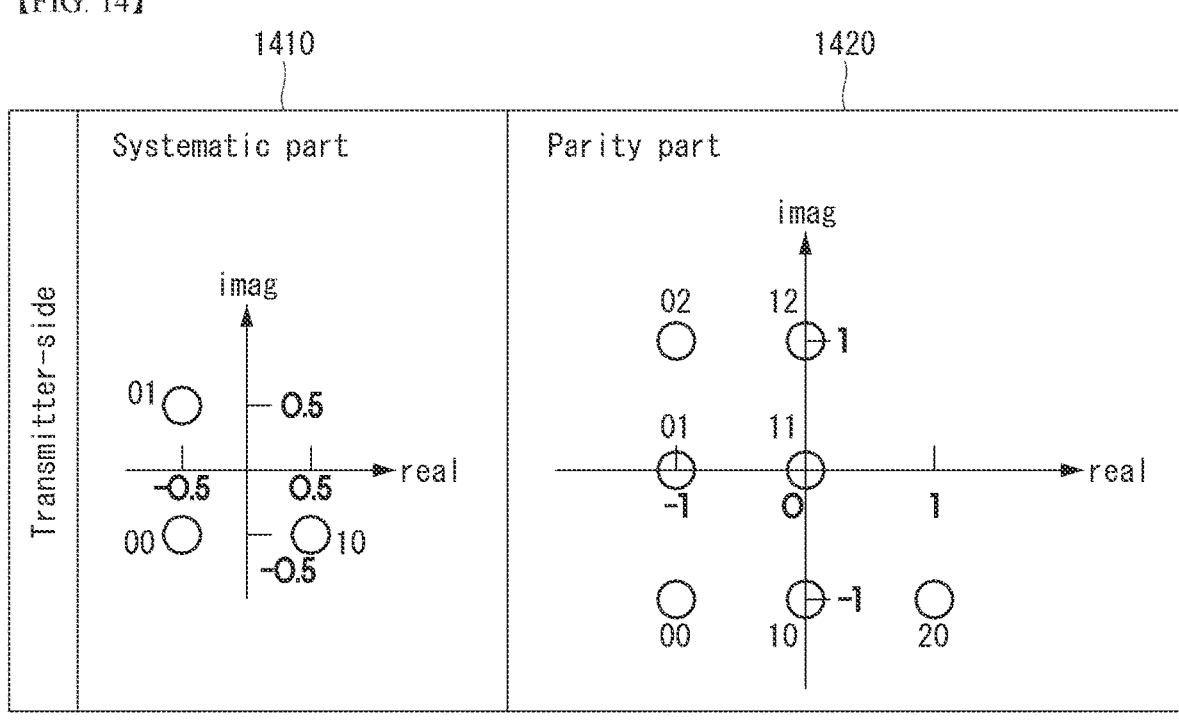
[FIG. 15]
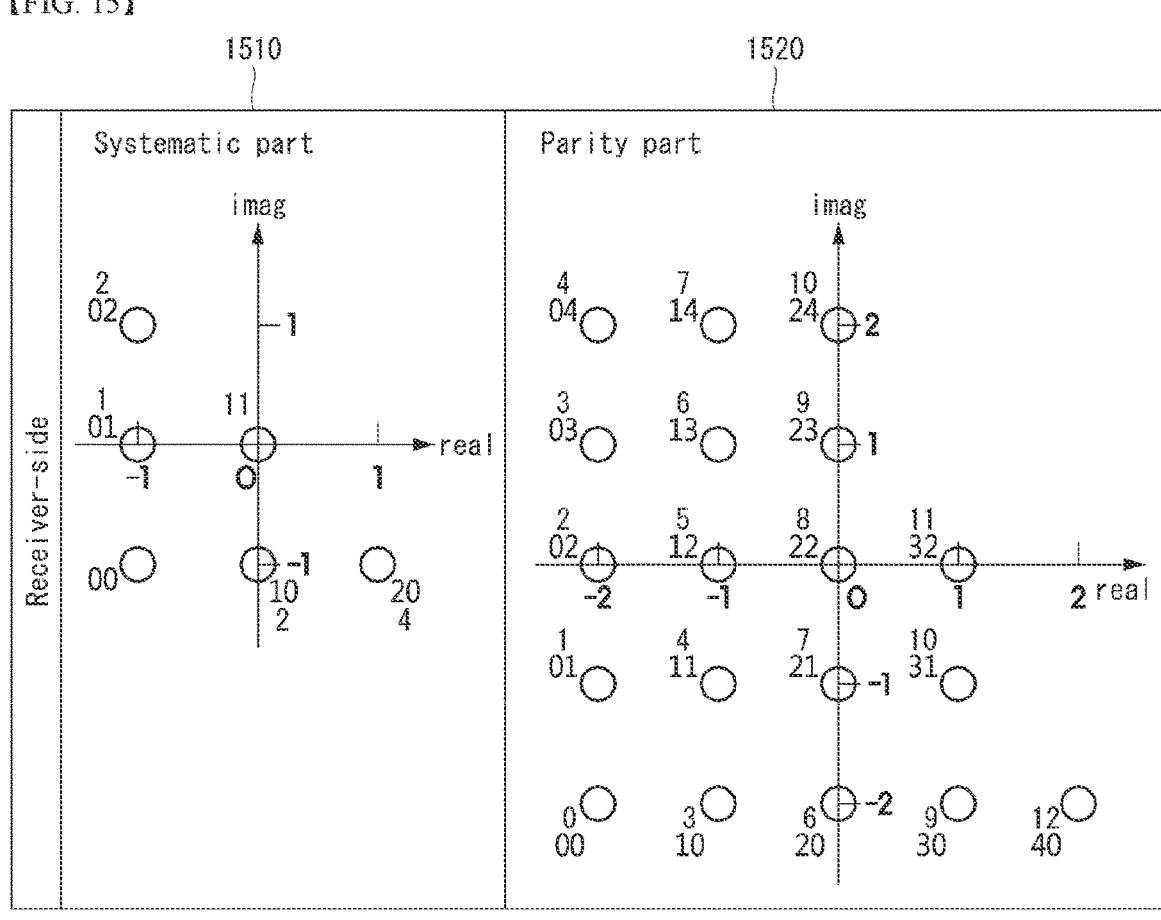

【FIG. 16】
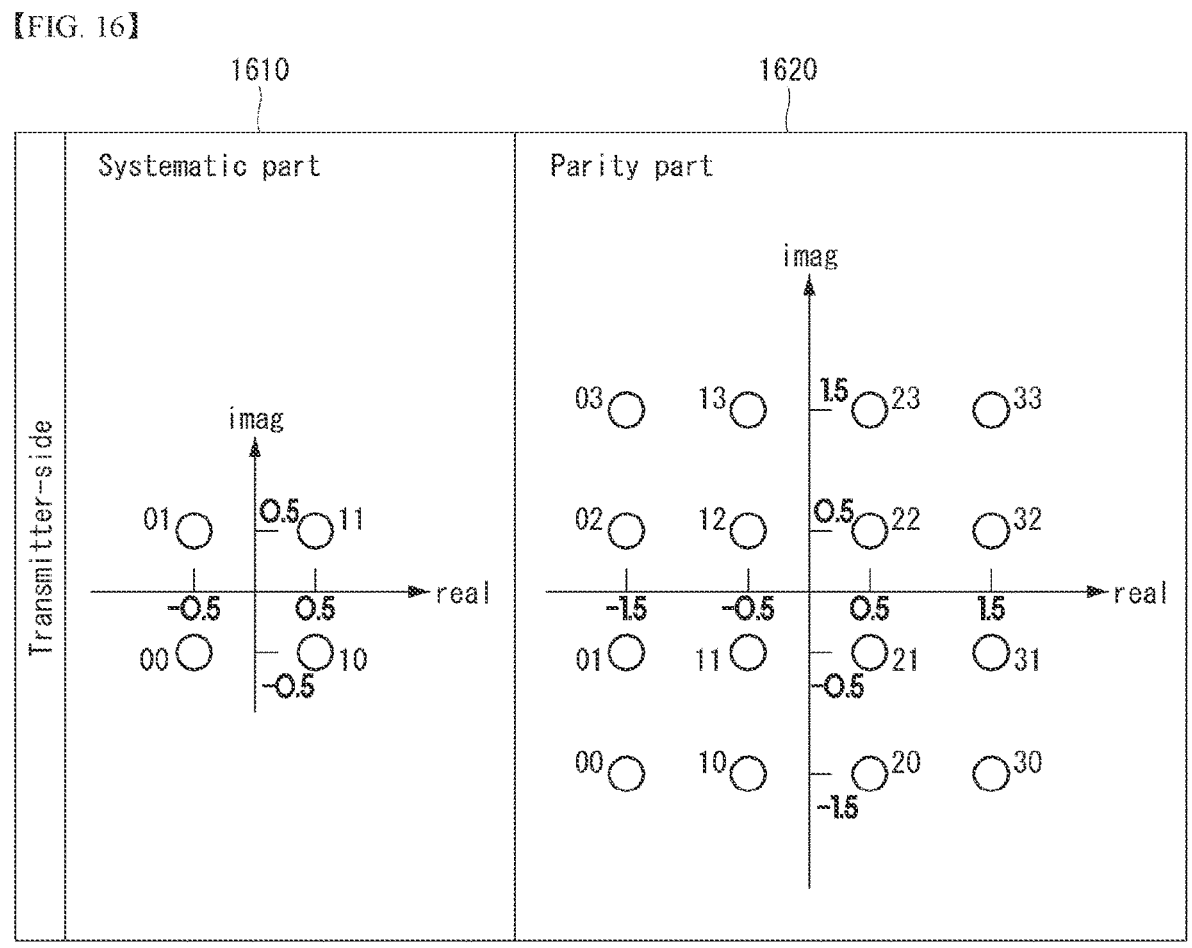

[FIG. 17]
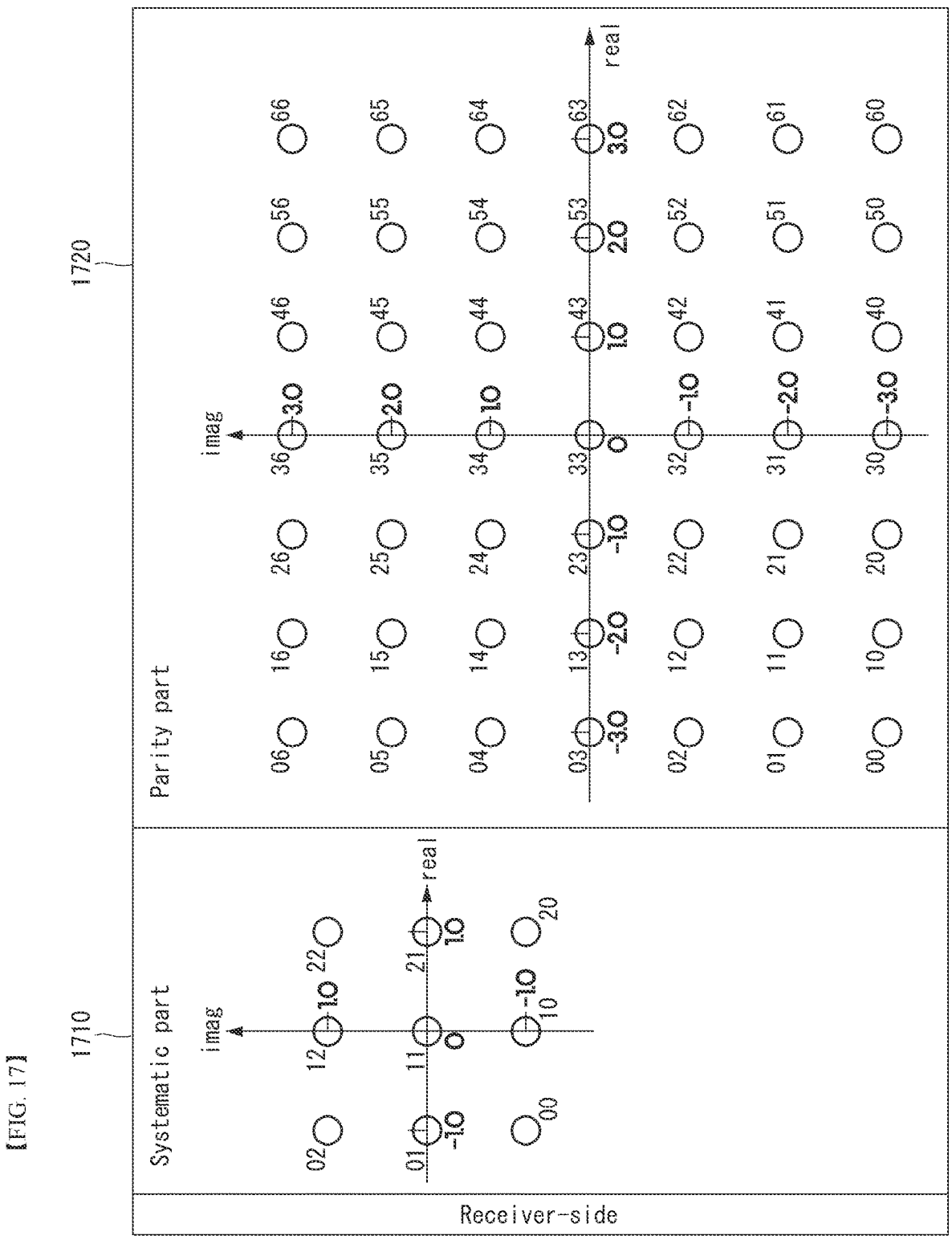

【FIG. 18】
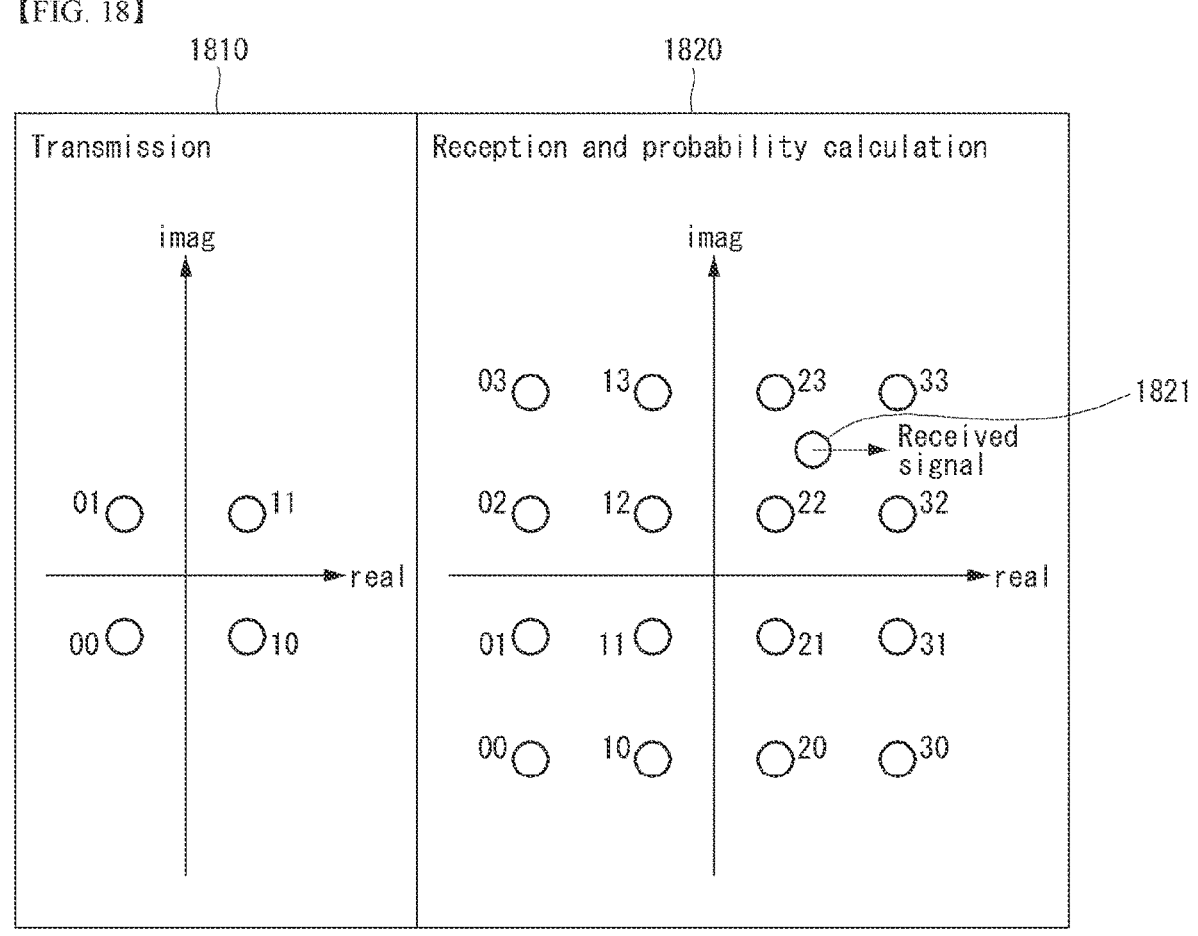

【FIG. 19】
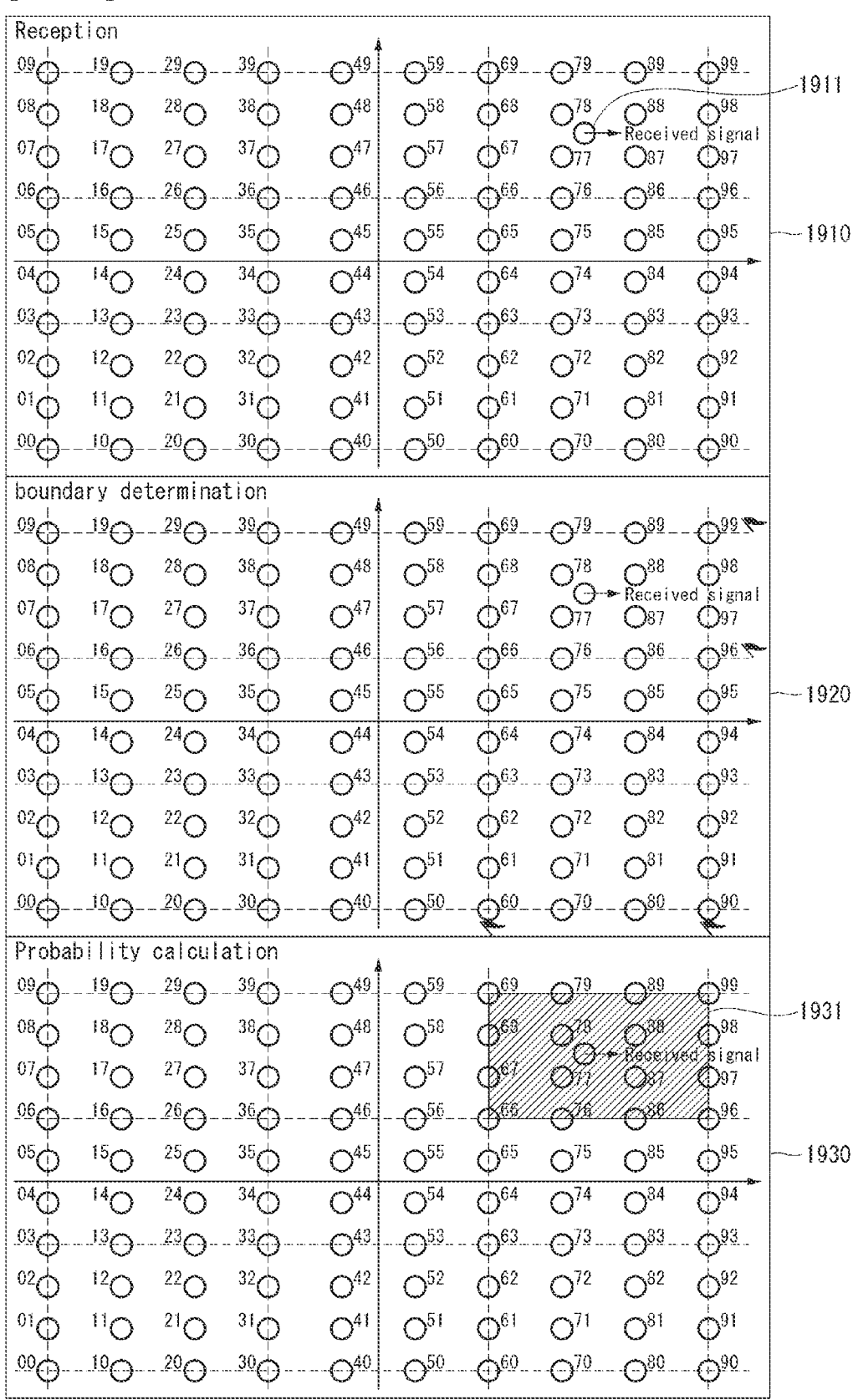

[FIG. 20]
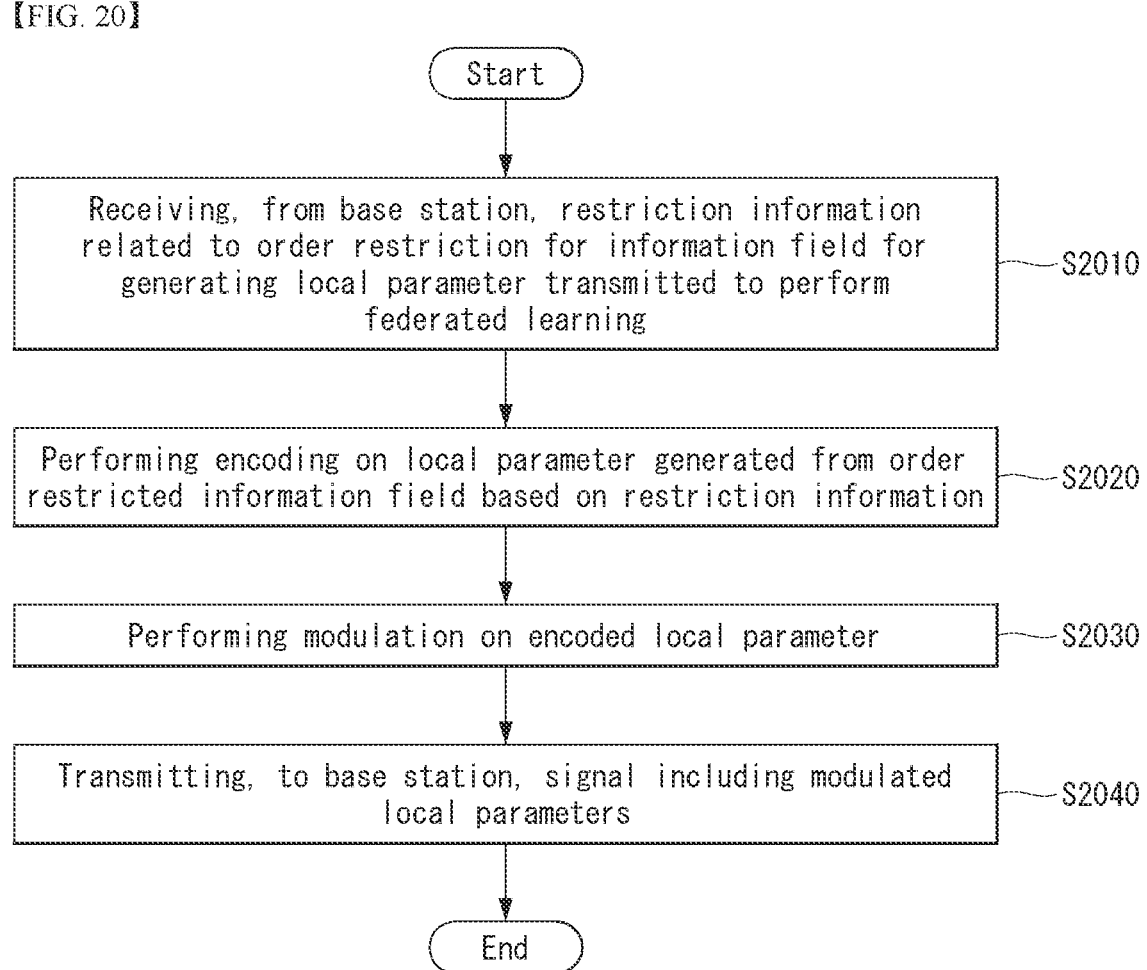

[FIG. 21]
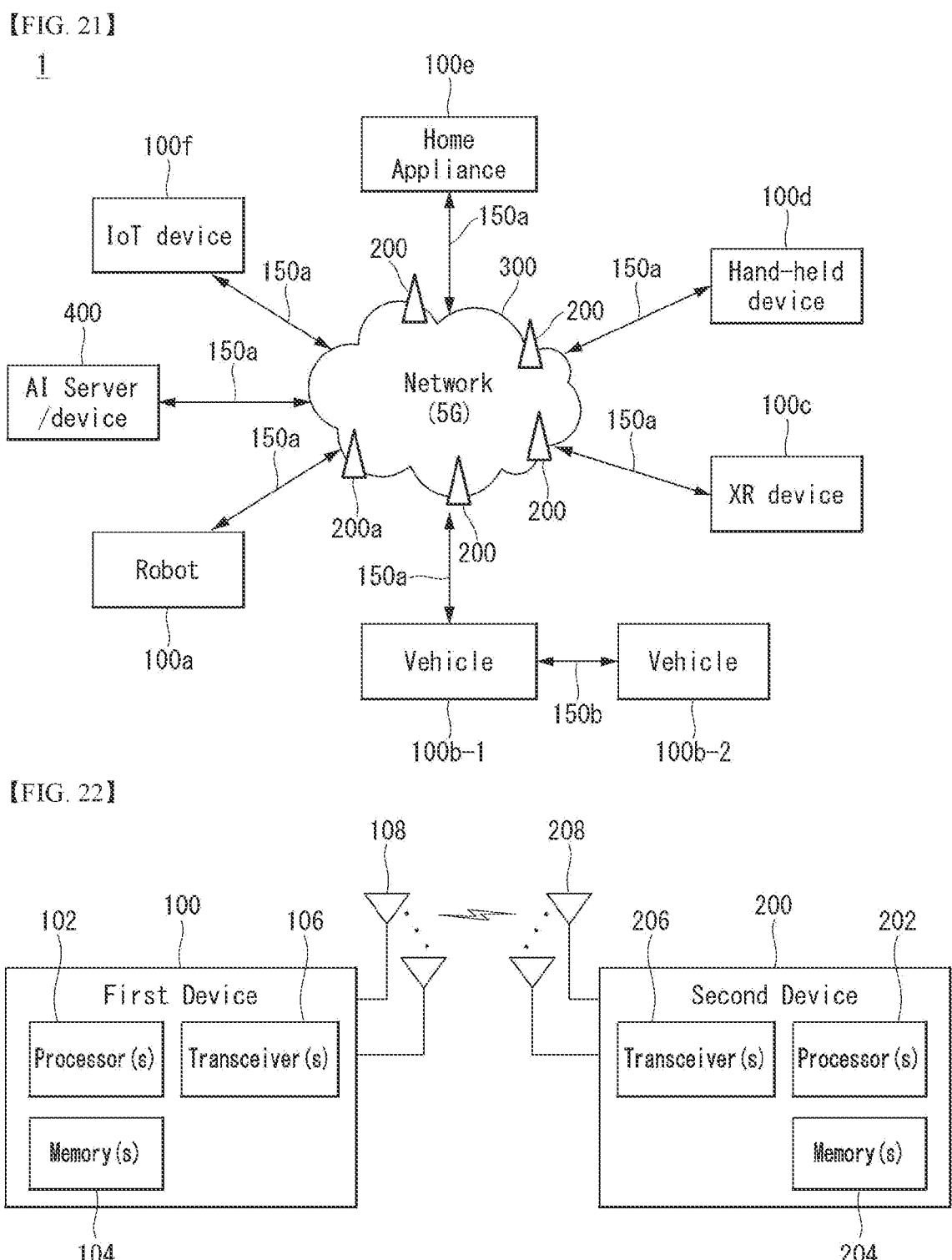
[FIG. 22]

【FIG. 23】
1000(102/106, 202/206)
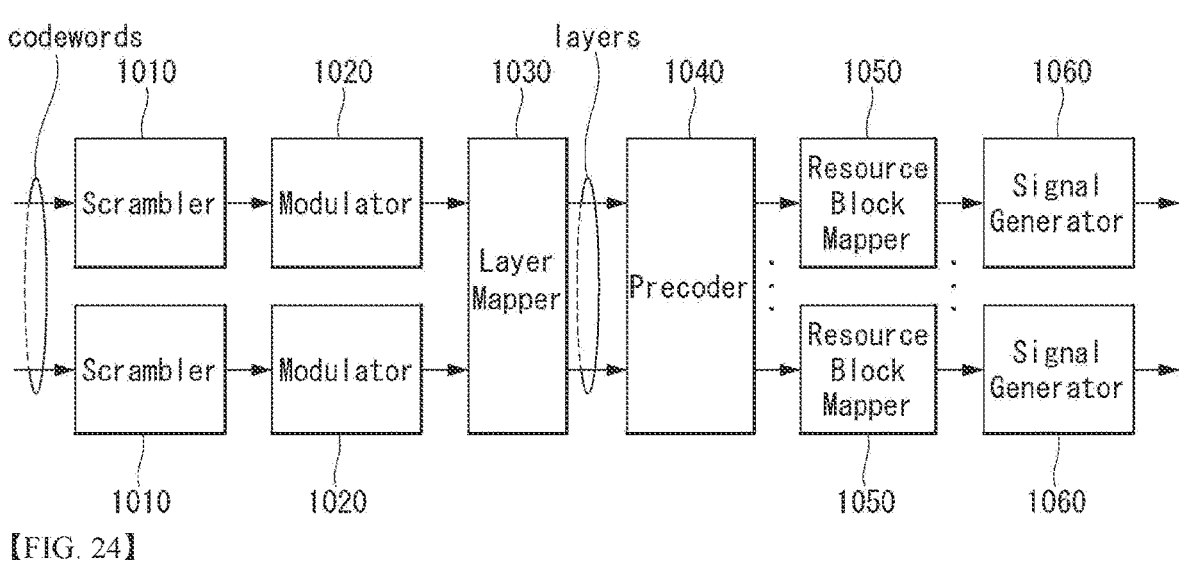
【FIG. 24】
Device(100, 200)
| | |
|---|---|
| Communication unit(110)<br>(e.g., 5G communication unit) | Control unit(120)<br>(e.g., processor(s)) |
| Communication circuit(112)<br>(e.g., processor(s),memory(s)) | Memory unit(130)<br>(e.g., RAM, storage) |
| Transceiver(s)(114)<br>(e.g., RF unit(s),antenna(s)) | Additional components(140)<br>(e.g., power unit/battery,<br>I/O unit,driving unit,<br>computing unit) |

Figure 26:
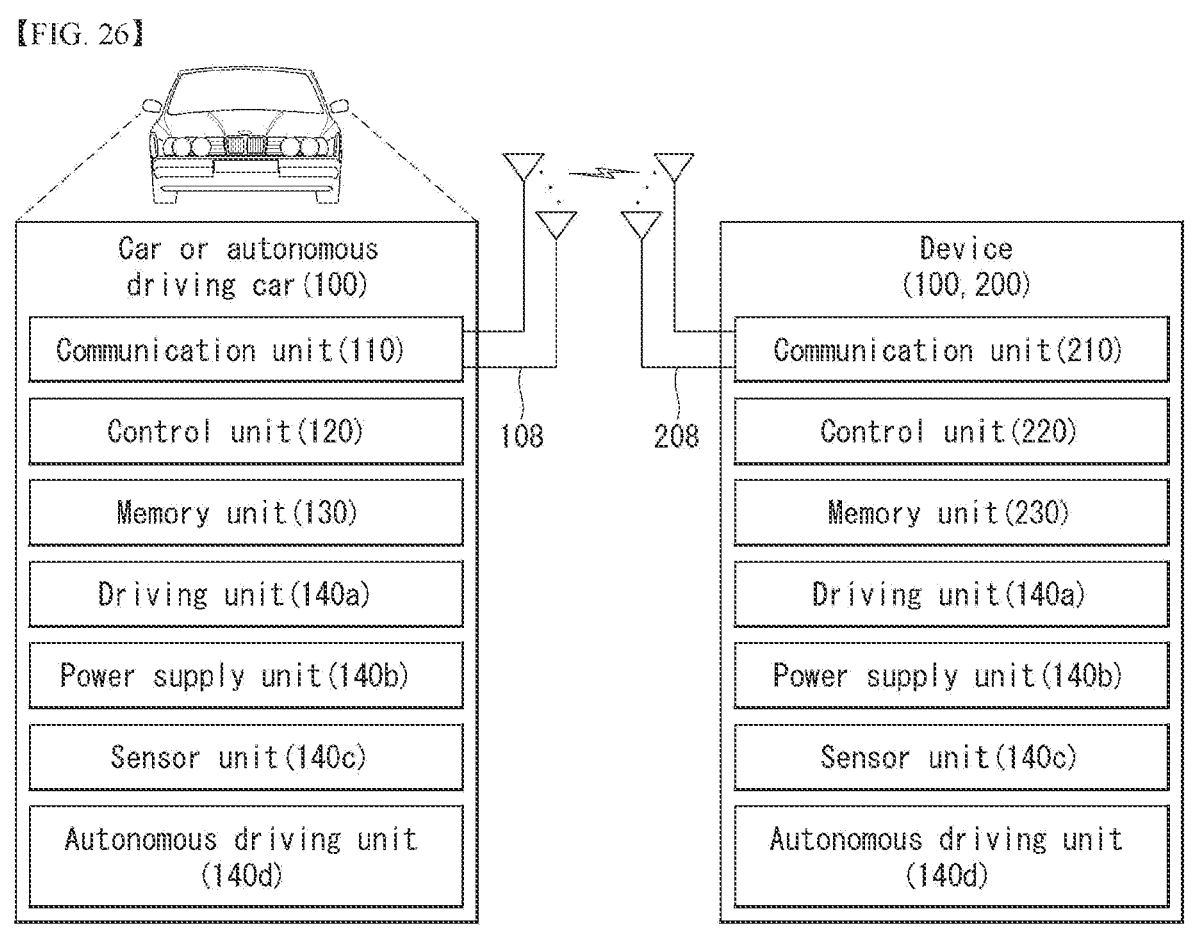

| Car or autonomous driving car (100) | | Device (100, 200) |
|---|---|---|
| Communication unit (110) | | Communication unit (210) |
| Control unit (120) | 108　208 | Control unit (220) |
| Memory unit (130) | | Memory unit (230) |
| Driving unit (140a) | | Driving unit (140a) |
| Power supply unit (140b) | | Power supply unit (140b) |
| Sensor unit (140c) | | Sensor unit (140c) |
| Autonomous driving unit (140d) | | Autonomous driving unit (140d) |

【FIG. 27】
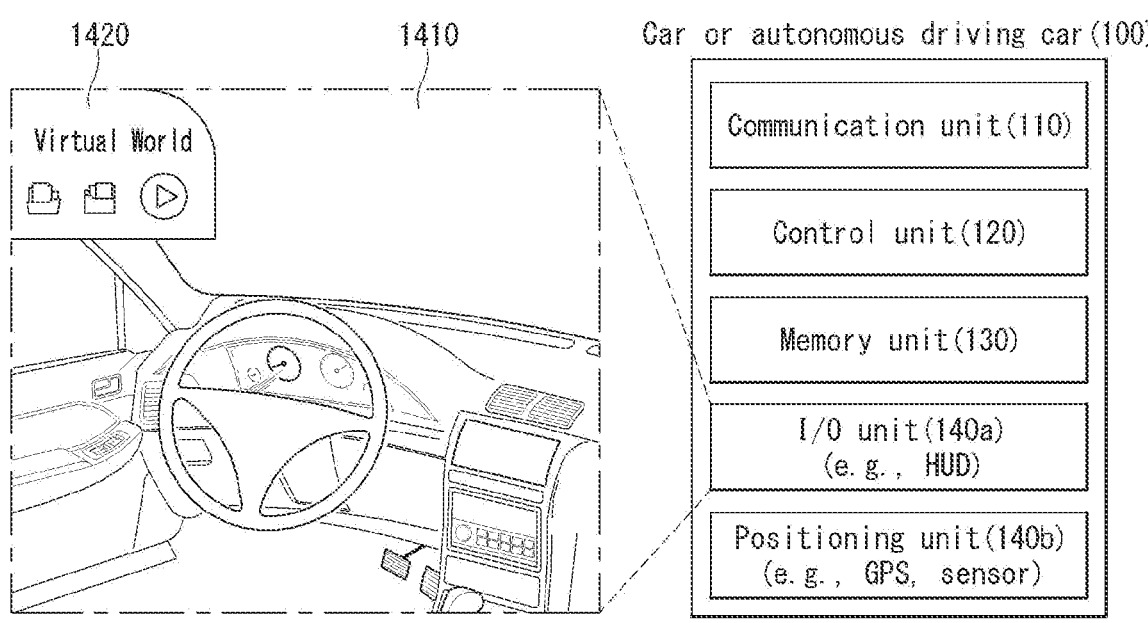
1420    1410    Car or autonomous driving car(100)
Virtual World
Communication unit(110)
Control unit(120)
Memory unit(130)
I/O unit(140a)
(e.g., HUD)
Positioning unit(140b)
(e.g., GPS, sensor)
【FIG. 28】
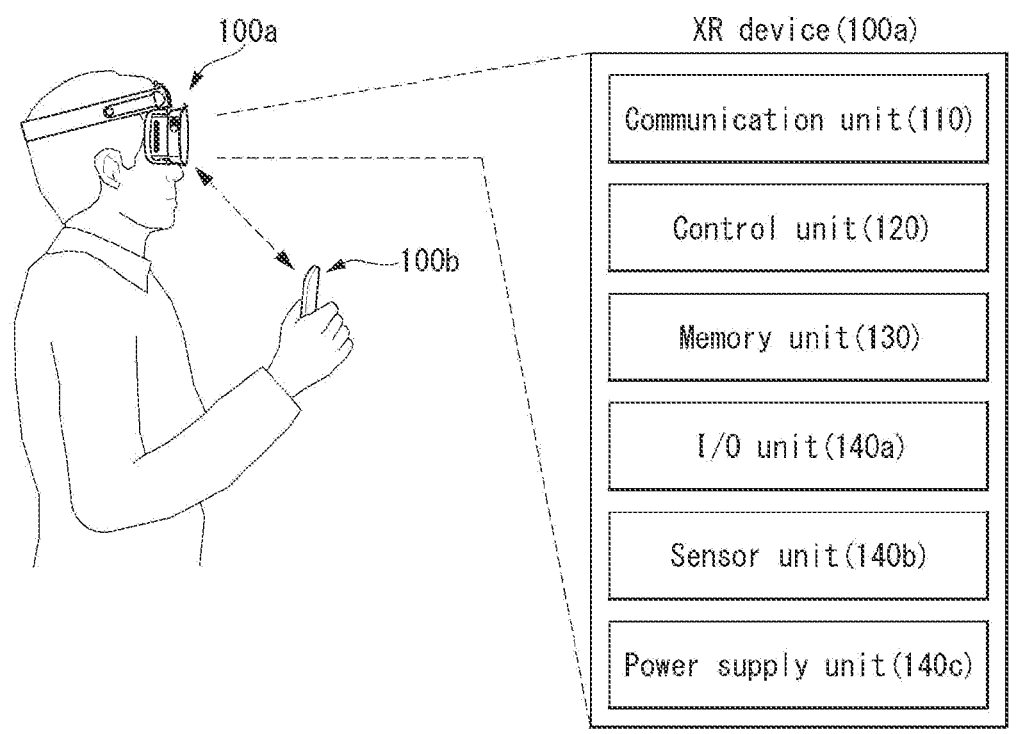
100a    XR device(100a)
100b
Communication unit(110)
Control unit(120)
Memory unit(130)
I/O unit(140a)
Sensor unit(140b)
Power supply unit(140c)

[FIG. 29]
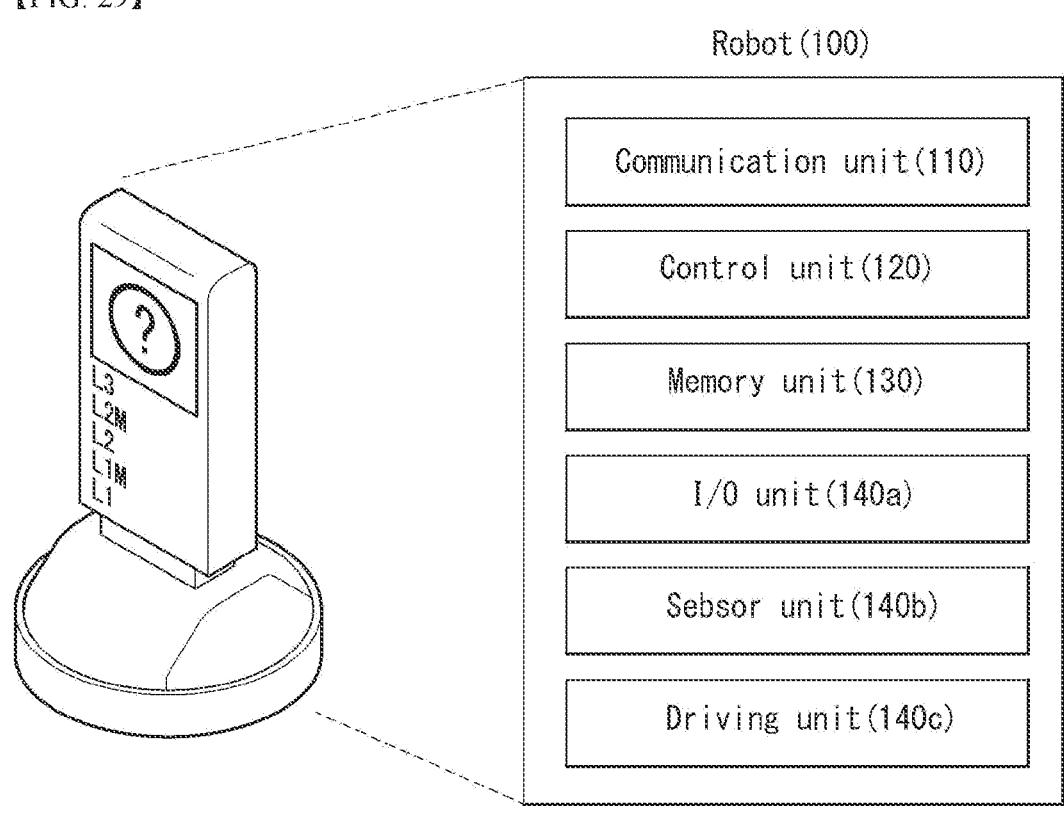
Robot(100)
Communication unit(110)
Control unit(120)
Memory unit(130)
I/O unit(140a)
Sebsor unit(140b)
Driving unit(140c)
[FIG. 30]
100
120
110 — Communication Unit
140a — Input Unit
140c — Learning Processor Unit
Control Unit
Memory Unit — 130
Output Unit — 140b
Sensing Unit — 140d

METHOD FOR PERFORMING FEDERATED LEARNING IN WIRELESS COMMUNICATION SYSTEM, AND APPARATUS THEREFOR

CROSS-REFERENCE TO RELATED APPLICATIONS

This application is a National Stage application under 35 U.S.C. § 371 of International Application No. PCT/KR2021/007899, filed on Jun. 23, 2021. The disclosure of the prior application is incorporated by reference in its entirety.

TECHNICAL FIELD

The present disclosure relates to a method for performing federated learning, and more specifically, to a method for performing federated learning by a plurality of user equipments (UEs) in a wireless communication system and an apparatus therefor.

BACKGROUND ART

Wireless communication systems have been widely deployed to provide various types of communication services such as voice or data. In general, the wireless communication system is a multiple access system capable of supporting communication with multiple users by sharing available system resources (bandwidth, transmission power, etc.). Examples of multiple access systems include a Code Division Multiple Access (CDMA) system, a Frequency Division Multiple Access (FDMA) system, a Time Division Multiple Access (TDMA) system, a Space Division Multiple Access (SDMA) system, an Orthogonal Frequency Division Multiple Access (OFDMA) system, a Single Carrier Frequency Division Multiple Access (SC-FDMA) system, and an Interleave Division Multiple Access (IDMA) system.

DISCLOSURE

Technical Problem

The purpose of the present disclosure is to provide a method for performing federated learning in a wireless communication system, and an apparatus therefor.

Additionally, the purpose of the present disclosure is to provide a method of configuring a finite field for performing federated learning in a wireless communication system, and an apparatus therefor.

Additionally, the purpose of the present disclosure is to provide a method of configuring a finite field according to an order of an information field for performing federated learning in a wireless communication system, and an apparatus therefor.

Additionally, the purpose of the present disclosure is to provide a method of performing data modulation and demodulation based on a finite field constructed according to an order of an information field for performing federated learning in a wireless communication system, and an apparatus therefor.

Additionally, the purpose of the present disclosure is to provide a method for restricting an order of an information field for performing federated learning in a wireless communication system, and an apparatus therefor.

Additionally, the purpose of the present disclosure is to provide a method of performing federated learning based on an order restricted information field in a wireless communication system, and an apparatus therefor.

Technical objects to be achieved by the present disclosure are not limited to the aforementioned technical objects, and other technical objects not described above may be evidently understood by a person having ordinary skill in the art to which the present disclosure pertains from the following description.

Technical Solution

The present disclosure provides a method for performing federated learning in a wireless communication system, and an apparatus therefor.

More specifically, in the present disclosure, a method for performing federated learning by a plurality of user equipments (UEs) in a wireless communication system, the method performed by one of the plurality of UEs comprises receiving, from a base station, restriction information related to an order restriction for an information field for generating a local parameter transmitted by the one UE to perform the federated learning; performing encoding on the local parameter generated from an order restricted information field based on the restriction information, wherein the encoded local parameter consists of a systematic bit part and a parity part; performing modulation on the encoded local parameter, wherein the modulation is performed in different ways for each of the systematic bit part and the parity part; and transmitting, to the base station, a signal including the modulated local parameters.

In addition, in the present disclosure, the way of the modulation may be determined based on whether an order value of the information field is (i) a prime number or (ii) the prime number to the power of 2n, and the n may be a natural number.

In addition, in the present disclosure, based on the order value of the information field being the prime number, the modulation may be performed based only on a real number domain among the real number domain and an imaginary number domain on a complex domain in which the modulation is performed.

In addition, in the present disclosure, the modulation may be performed by applying differently a modulation offset value used for the modulation to the systematic bit part and the parity part.

In addition, in the present disclosure, the modulation offset value for the systematic bit part may be determined based on an order value of the order restricted information field, and the modulation offset value for the parity part may be determined based on the order value of the information field.

In addition, in the present disclosure, the modulation offset value for the systematic bit part and the modulation offset value for the parity part may be determined based on equation below, $$b = \begin{cases} \dfrac{\sum_{i=0}^{Q-1} i}{Q}, & \text{if parity part,} \\ \dfrac{\sum_{i=0}^{Q_1-1} i}{Q_1}, & \text{if systematic bit part.} \end{cases} \qquad \text{[Equation]}$$

Where, b is the modulation offset value, Q is the order value of the information field, and Q1 is the order value of the order restricted information field.

In addition, in the present disclosure, based on the order value of the information field being the prime number, the modulation may be performed based on both a real number domain and an imaginary number domain on a complex domain in which the modulation is is performed.

In addition, in the present disclosure, the modulation may be performed by applying differently a modulation offset value used for the modulation to the systematic bit part and the panty part, and by applying differently (i) a way in which a modulation symbol for the systematic bit part is mapped onto the complex domain, and (ii) a way in which a modulation symbol for the parity part is mapped onto the complex domain.

In addition, in the present disclosure, the modulation offset value for the systematic bit part may be determined based on an order value of the order restricted information field, the modulation offset value for the parity part may be determined based on the order value of the information field, the way in which the modulation symbol for the systematic bit part is mapped onto the complex domain may be determined based on the order value of the order restricted information field, and the way in which the modulation symbol for the parity part is mapped onto the complex domain may be determined based on the order value of the information field.

In addition, in the present disclosure, the modulation offset value for the systematic bit part and the modulation offset value for the parity part may be determined based on equation below, $$ b = \begin{cases} \dfrac{\sum_{i=0}^{\lceil \sqrt{Q} \rceil - 1} i}{\lceil \sqrt{Q} \rceil}, & \text{if parity part,} \\ \dfrac{\sum_{i=0}^{\lceil \sqrt{Q_1} \rceil - 1} i}{\lceil \sqrt{Q_1} \rceil}, & \text{if systematic bit part} \end{cases} \quad \text{[Equation]} $$

Where, b is the modulation offset value, Q is the order value of the information field, Q1 is the order value of the order restricted information field, and $\lceil \ \rceil$ is a ceiling function.

In addition, in the present disclosure, the way in which the modulation symbol for the systematic bit part and the modulation symbol for the parity part are mapped onto the real number domain may be determined based on equation below, $$ t_{u,0}[n] = \begin{cases} \left\lfloor \dfrac{c_u[n]}{\lceil \sqrt{Q} \rceil} \right\rfloor, & \text{if parity part,} \\ \left\lfloor \dfrac{c_u[n]}{\lceil \sqrt{Q_1} \rceil} \right\rfloor, & \text{if systematic bit part} \end{cases} \quad \text{[Equation]} $$

The way in which the modulation symbol for the systematic bit part and the modulation symbol for the parity part are mapped onto the imaginary number domain may be determined based on equation below, $$ t_{u,1}[n] = \begin{cases} (c_u[n])_{\lceil \sqrt{Q} \rceil}, & \text{if parity part,} \\ (c_u[n])_{\lceil \sqrt{Q_1} \rceil}, & \text{if systematic bit part} \end{cases} \quad \text{[Equation]} $$

In the above equations, $c_u[n]$ is a codeword of a specific UE whose UE index is u among the plurality of UEs to which a UE index is assigned, $t_{u,0}[n]$ is a value on the real number domain of the modulation symbol for the $c_u[n]$, Q is the order value of the information field, and Q1 is the order value of the order restricted information field, and $\lceil \ \rceil$ is the ceiling function, $$ (c_u[n])_{\lceil \sqrt{Q} \rceil} $$

is a modulo operation of the $c_u[n]$ with $\lceil \sqrt{Q} \rceil$, and $$ (c_u[n])_{\lceil \sqrt{Q_1} \rceil} $$

is a modulo operation of the $c_u[n]$ with $\lceil \sqrt{Q_1} \rceil$.

In addition, in the present disclosure, based on the order value of the information field being the prime number to the power of 2n, the modulation may be performed based on both a real number domain and an imaginary number domain on a complex domain in which the is modulation is performed.

In addition, in the present disclosure, the modulation may be performed by applying differently a modulation offset value used for the modulation to the systematic bit part and the panty part.

In addition, in the present disclosure, the modulation offset value for the systematic bit part and the modulation offset value for the parity part may be determined based on equation below, $$ b = \begin{cases} \dfrac{\sum_{i=0}^{q-1} i}{q}, & \text{if parity part,} \\ \dfrac{\sum_{i=0}^{Q^*-1} i}{Q^*}, & \text{if systematic bit part.} \end{cases} \quad \text{[Equation]} $$

Where, b is the modulation offset value, q is a number corresponding to the prime number to the power of n, and Q* is the order value of the information field available to the one UE.

In addition, in the present disclosure, a user equipment (UE) for performing federated learning with a plurality of user equipments (UEs) in a wireless communication system, the UE comprises a transmitter configured to transmit a wireless signal, a receiver configured to receive a wireless signal; at least one processor, and at least one computer memory operably connected to the at least one processor, and storing instructions for performing operations when on being executed by the at least one processor, wherein the operations includes receiving, from a base station, restriction information related to an order restriction for an information field for generating a local parameter transmitted by the one UE to perform the federated learning; performing encoding on the local parameter generated from an order restricted information field based on the restriction information, wherein the encoded local parameter consists of a systematic bit part and a parity part; performing modulation on the encoded local parameter, wherein the modulation is performed in different ways for each of the systematic bit part and the parity part; and transmitting, to the base station, a signal including the modulated local parameters.

In addition, in the present disclosure, a method for performing federated learning by a base station with a plurality of user equipments (UEs) in a wireless communication system, the method comprises transmitting, to the plurality of UEs, restriction information related to an order restriction for an information field for generating a local parameter transmitted by the plurality of UEs to perform the federated learning; and receiving a signal including the local parameter from the plurality of UEs, wherein the local parameter is generated and encoded from an order restricted information field based on the restriction information, wherein the encoded local parameter consists of a systematic bit part and a panty part, and wherein each of the systematic bit part and the parity part of the encoded local parameter is modulated in a different way.

In addition, in the present disclosure, a base station for performing federated learning with a plurality of user equipments (UEs) in a wireless communication system, the base station comprises a transmitter configured to transmit a wireless signal; a receiver configured to receive a wireless signal; at least one processor; and at least one computer memory operably connected to the at least one processor, and storing instructions for performing operations when being executed by the at least one processor, wherein the operations includes transmitting, to the plurality of UEs, restriction information related to an order restriction for an information field for generating a local parameter transmitted by the plurality of UEs to perform the federated learning; and receiving a signal including the local parameter from the plurality of UEs, wherein the local parameter is generated and encoded from an order restricted information field based on the restriction information, wherein the encoded local parameter consists of a systematic bit part and a parity part, and wherein each of the systematic bit part and the parity part of the encoded local parameter is modulated in a different way.

In addition, in the present disclosure, a non-transitory computer readable medium (CRM) storing one or more instructions, wherein the one or more instruction being executed by one or more processors cause a user equipment (UE) to receive, from a base station, restriction information related to an order restriction for an information field for generating a local parameter transmitted by the UE to perform the federated learning, perform encoding on the local parameter generated from an order restricted information field based on the restriction information, perform modulation on the encoded local parameter, and transmit a signal including the modulated local parameter to the base station, wherein the encoded local parameter consists of a systematic bit part and a parity part, and wherein the modulation is performed in different ways for each of the systematic bit part and the parity part.

In addition, in the present disclosure, an apparatus comprising one or more memories and one or more processors functionally connected to the one or more memories, wherein the one or more processors control the apparatus to receive, from a base station, restriction information related to an order restriction for an information field for generating a local parameter transmitted by a user equipment (UE) to perform the federated learning, perform encoding on the local parameter generated from an order restricted information field based on the restriction information, perform modulation on the encoded local parameter, and transmit a signal including the modulated local parameter to the base station, wherein the encoded local parameter consists of a systematic bit part and a parity part, and wherein the modulation is performed in different ways for each of the systematic bit part and the parity part.

Advantageous Effects

The present disclosure has an effect capable of performing federated learning in a wireless communication system.

Additionally, the present disclosure has an effect capable of configuring a finite field for performing federated learning in a wireless communication system.

Additionally, the present disclosure has an effect capable of configuring a finite field according to the order of the information field for performing federated learning in a wireless communication system.

Additionally, the present disclosure has an effect capable of performing data modulation and demodulation based on the finite field configured according to the order of the information field to perform federated learning in a wireless communication system.

Additionally, the present disclosure has an effect capable of improving the reliability of federated learning by restricting the order of the information field for performing federated learning in a wireless communication system.

Effects which may be obtained by the present disclosure are not limited to the aforementioned effects, and other technical effects not described above may be evidently understood by a person having ordinary skill in the art to which the present disclosure pertains from the following description.

DESCRIPTION OF DRAWINGS

The accompanying drawings, which are included to provide a further understanding of the present disclosure and constitute a part of the detailed description, illustrate embodiments of the present disclosure and serve to explain technical features of the present disclosure together with the description.

FIG. 1 illustrates physical channels and general signal transmission used in a 3GPP system.

FIG. 2 illustrates an example of a communication structure providable in a 6G system.

FIG. 3 illustrates an example of a structure of a perceptron.

FIG. 4 illustrates an example of a structure of a multilayer perceptron.

FIG. 5 illustrates an example of a deep neural network.

FIG. 6 illustrates an example of a convolutional neural network.

FIG. 7 illustrates an example of a filter operation in a convolutional neural network.

FIG. 8 illustrates an example of a neural network structure in which a circular loop exists.

FIG. 9 illustrates an example of an operation structure of a recurrent neural network.

FIG. 10 is a diagram illustrating an example of federated learning performed between a plurality of devices and a server.

FIG. 11 is a diagram illustrating another example of federated learning performed between a plurality of devices and a server.

FIGS. 12 to 17 illustrate examples in which a modulation method proposed in the present disclosure is performed.

FIGS. 18 and 19 illustrate examples in which a demodulation method proposed in the present disclosure is performed.

FIG. 20 is a flowchart illustrating an example of a method for performing federated learning in a wireless communication system proposed in the present disclosure.

FIG. 21 illustrates a communication system 10 applied to the present disclosure.

FIG. 22 illustrates a wireless device applicable to the present disclosure.

FIG. 23 illustrates a signal processing circuit for a transmission signal.

FIG. 24 illustrates another example of a wireless device applied to the present disclosure.

FIG. 25 illustrates a hand-held device applied to the present disclosure.

FIG. 26 illustrates a vehicle or an autonomous vehicle applied to the present disclosure.

FIG. 27 illustrates a vehicle applied to the present disclosure.

FIG. 28 illustrates an XR device applied to the present disclosure.

FIG. 29 illustrates a robot applied to the present disclosure.

FIG. 30 illustrates an AI device applied to the present disclosure.

MODE FOR INVENTION

The following technology may be used in various radio access system including CDMA, FDMA, TDMA, OFDMA, SC-FDMA, and the like. The CDMA may be implemented as radio technology such as Universal Terrestrial Radio Access (UTRA) or CDMA2000. The TDMA may be implemented as radio technology such as a global system for mobile communications (GSM)/general packet radio service (GPRS)/enhanced data rates for GSM evolution (EDGE). The OFDMA may be implemented as radio technology such as Institute of Electrical and Electronics Engineers (IEEE) 802.11 (Wi-Fi), IEEE 802.16 (WiMAX), IEEE 802.20, Evolved UTRA (E-UTRA), or the like. The UTRA is a part of Universal Mobile Telecommunications System (UMTS). 3rd Generation Partnership Project (3GPP) Long Term Evolution (LTE) is a part of Evolved UMTS (E-UMTS) using the E-UTRA and LTE-Advanced (A)/LTE-A pro is an evolved version of the 3GPP LTE. 3GPP NR (New Radio or New Radio Access Technology) is an evolved version of the 3GPP LTE/LTE-A/LTE-A pro. 3GPP 6G may be an evolved version of 3GPP NR.

For clarity in the description, the following description will mostly focus on 3GPP communication system (e.g. LTE-A or 5G NR). However, technical features according to an embodiment of the present disclosure will not be limited only to this. LTE means technology after 3GPP TS 36.xxx Release 8. In detail, LTE technology after 3GPP TS 36.xxx Release is referred to as the LTE-A and LTE technology after 3GPP TS 36.xxx Release 13 is referred to as the LTE-A pro. The 3GPP NR means technology after TS 38.xxx Release 15. The LTE/NR may be referred to as a 3GPP system. "xxx" means a detailed standard document number. The LTE/NR/6G may be collectively referred to as the 3GPP system. For terms and techniques not specifically described among terms and techniques used in the present disclosure, reference may be made to a wireless communication standard document published before the present disclosure is filed. For example, the following document may be referred to.

Figure 1:
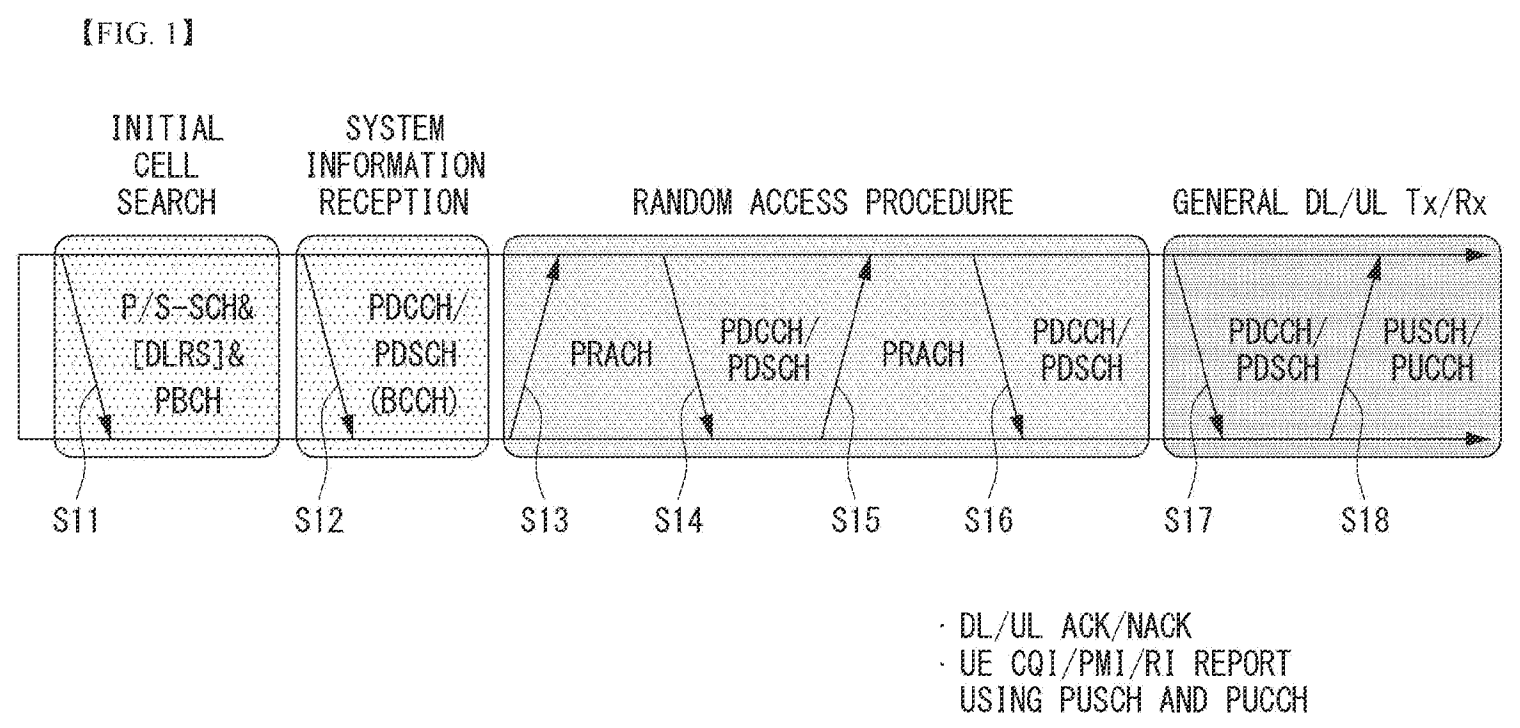

3GPP LTE
36.211: Physical channels and modulation
36.212: Multiplexing and channel coding
36.213: Physical layer procedures 36.300: Overall description
36.331: Radio Resource Control (RRC)
3GPP NR
38.211: Physical channels and modulation
38.212: Multiplexing and channel coding
38.213: Physical layer procedures for control
38.214: Physical layer procedures for data
38.300: NR and NG-RAN Overall Description
38.331: Radio Resource Control (RRC) protocol specification Physical Channel and Frame Structure
Physical Channel and General Signal Transmission FIG. 1 illustrates physical channels and general signal transmission used in a 3GPP system. In a wireless communication system, the UE receives information from the eNB through Downlink (DL) and the UE transmits information from the eNB through Uplink (UL). The information which the eNB and the UE transmit and receive includes data and various control information and there are various physical channels according to a type/use of the information which the eNB and the UE transmit and receive.

When the UE is powered on or newly enters a cell, the UE performs an initial cell search operation such as synchronizing with the eNB (S701). To this end, the UE may receive a Primary Synchronization Signal (PSS) and a (Secondary Synchronization Signal (SSS) from the eNB and synchronize with the eNB and acquire information such as a cell ID or the like. Thereafter, the UE may receive a Physical Broadcast Channel (PBCH) from the eNB and acquire in-cell broadcast information. Meanwhile, the UE receives a Downlink Reference Signal (DL RS) in an initial cell search step to check a downlink channel status.

A UE that completes the initial cell search receives a Physical Downlink Control Channel (PDCCH) and a Physical Downlink Control Channel (PDSCH) according to information loaded on the PDCCH to acquire more specific system information (S12).

Meanwhile, when there is no radio resource first accessing the eNB or for signal transmission, the UE may perform a Random Access Procedure (RACH) to the eNB (S13 to S16). To this end, the UE may transmit a specific sequence to a preamble through a Physical Random Access Channel (PRACH) (S13 and S15) and receive a response message (Random Access Response (RAR) message) for the preamble through the PDCCH and a corresponding PDSCH. In the case of a contention based RACH, a Contention Resolution Procedure may be additionally performed (S16).

The UE that performs the above procedure may then perform PDCCH/PDSCH reception (S17) and Physical Uplink Shared Channel (PUSCH)/Physical Uplink Control Channel (PUCCH) transmission (S18) as a general uplink/downlink signal transmission procedure. In particular, the UE may receive Downlink Control Information (DCI) through the PDCCH. Here, the DCI may include control information such as resource allocation information for the UE and formats may be differently applied according to a use purpose.

Meanwhile, the control information which the UE transmits to the eNB through the uplink or the UE receives from the eNB may include a downlink/uplink ACK/NACK signal, a Channel Quality Indicator (CQI), a Precoding Matrix Index (PMI), a Rank Indicator (RI), and the like. The UE may transmit the control information such as the CQI/PMI/RI, etc., via the PUSCH and/or PUCCH.

Structure of Uplink and Downlink Channels

Downlink Channel Structure

A base station transmits a related signal to a UE via a downlink channel to be described later, and the UE receives the related signal from the base station via the downlink channel to be described later.

(1) Physical Downlink Shared Channel (PDSCH)

A PDSCH carries downlink data (e.g., DL-shared channel transport block, DL-SCH TB) and is applied with a modulation method such as quadrature phase shift keying (QPSK), 16 quadrature amplitude modulation (QAM), 64 QAM, and 256 QAM. A codeword is generated by encoding TB. The PDSCH may carry multiple codewords. Scrambling and modulation mapping are performed for each codeword, and modulation symbols generated from each codeword are mapped to one or more layers (layer mapping). Each layer is mapped to a resource together with a demodulation reference signal (DMRS) to generate an OFDM symbol signal, and is transmitted through a corresponding antenna port.

(2) Physical Downlink Control Channel (PDCCH)

A PDCCH carries downlink control information (DCI) and is applied with a QPSK modulation method, etc. One PDCCH consists of 1, 2, 4, 8, or 16 control channel elements (CCEs) based on an aggregation level (AL). One CCE consists of 6 resource element groups (REGs). One REG is defined by one OFDM symbol and one (P)RB.

The UE performs decoding (aka, blind decoding) on a set of PDCCH candidates to acquire DCI transmitted via the PDCCH. The set of PDCCH candidates decoded by the UE is defined as a PDCCH search space set. The search space set may be a common search space or a UE-specific search space. The UE may acquire DCI by monitoring PDCCH candidates in one or more search space sets configured by MIB or higher layer signaling.

Uplink Channel Structure

A UE transmits a related signal to a base station via an uplink channel to be described later, and the base station receives the related signal from the UE via the uplink channel to be described later.

(1) Physical Uplink Shared Channel (PUSCH)

A PUSCH carries uplink data (e.g., UL-shared channel transport block, UL-SCH TB) and/or uplink control information (UCI) and is transmitted based on a CP-OFDM (Cyclic to Prefix-Orthogonal Frequency Division Multiplexing) waveform. DFT-s-OFDM (Discrete Fourier Transform-spread-Orthogonal Frequency Division Multiplexing) waveform, or the like. When the PUSCH is transmitted based on the DFT-s-OFDM waveform, the UE transmits the PUSCH by applying a transform precoding. For example, if the transform precoding is not possible (e.g., transform precoding is disabled), the UE may transmit the PUSCH based on the CP-OFDM waveform, and if the transform precoding is possible (e.g., transform precoding is enabled), the UE may transmit the PUSCH based on the CP-OFDM waveform or the DFT-s-OFDM waveform. The PUSCH transmission may be dynamically scheduled by an UL grant within DCI, or may be semi-statically scheduled based on high layer (e.g., RRC) signaling (and/or layer 1 (L1) signaling (e.g., PDCCH)) (configured grant). The PUSCH transmission may be performed based on a codebook or a non-codebook.

(2) Physical Uplink Control Channel (PUCCH)

A PUCCH carries uplink control information, HARQ-ACK, and/or scheduling request (SR), and may be divided into multiple PUCCHs based on a PUCCH transmission length.

6G System General

A 6G (wireless communication) system has purposes such as (i) a very high data rate per device, (ii) a very large number of connected devices, (iii) global connectivity, (iv) a very low latency, (v) a reduction in energy consumption of battery-free IoT devices. (vi) ultra-reliable connectivity, and (vii) connected intelligence with machine learning capability. The vision of the 6G system may include four aspects such as intelligent connectivity, deep connectivity, holographic connectivity, and ubiquitous connectivity, and the 6G system may satisfy the requirements shown in Table 1 below. That is, Table 1 shows an example of the requirements of the 6G system.

TABLE 1

| Per device peak data rate | 1 Tbps |
|---|---|
| E2E latency | 1 ms |
| Maximum spectral efficiency | 100 bps/Hz |
| Mobility support | Up to 1000 km/hr |
| Satellite integration | Fully |
| AI | Fully |
| Autonomous vehicle | Fully |
| XR | Fully |
| Haptic Communication | Fully |

The 6G system may have key factors such as enhanced mobile broadband (eMBB), ultra-reliable low latency communications (URLLC), massive machine type communications (mMTC), AI integrated communication, tactile Internet, high throughput, high network capacity, high energy efficiency, low backhaul and access network congestion, and enhanced data security.

FIG. 2 illustrates an example of a communication structure providable in a 6G system.

The 6G system is expected to have 50 times greater simultaneous wireless communication connectivity than a 5G wireless communication system. URLLC, which is the key feature of 5G, will become more important technology by providing an end-to-end latency less than 1 ms in 6G communication. The 6G system may have much better volumetric spectrum efficiency unlike frequently used domain spectrum efficiency. The 6G system can provide advanced battery technology for energy harvesting and very long battery life, and thus mobile devices may not need to be separately charged in the 6G system. In 6G, new network characteristics may be as follows.

Satellites integrated network: To provide a global mobile group, 6G will be integrated with satellite. Integration of terrestrial, satellite and public networks into one wireless communication system is critical for 6G.

Connected intelligence: Unlike the wireless communication systems of previous generations, 6G is innovative and may update wireless evolution from "connected things" to "connected intelligence". AI may be applied in each step (or each signal processing procedure to be described later) of a communication procedure.

Seamless integration of wireless information and energy transfer: A 6G wireless network may transfer power to charge batteries of devices such as smartphones and sensors. Therefore, wireless information and energy transfer (WIET) will be integrated.

Ubiquitous super 3D connectivity: Access to networks and core network functions of drone and very low earth orbit satellite will establish super 3D connectivity in 60 ubiquitous.

In the new network characteristics of 6G described above, several general requirements may be as follows.

Small cell networks: The idea of a small cell network has been introduced to improve received signal quality as a result of throughput, energy efficiency, and spectrum efficiency improvement in a cellular system. As a result, the small cell network is an essential feature for 5G and beyond 5G (5 GB) communication systems. Accordingly, the 6G communication system also employs the characteristics of the small cell network.

Ultra-dense heterogeneous network: Ultra-dense heterogeneous networks will be another important characteristic of the 6G communication system. A multi-tier network consisting of heterogeneous networks improves overall QoS and reduces costs.

High-capacity backhaul: Backhaul connectivity is characterized by a high-capacity backhaul network in order to support high-capacity traffic. A high-speed optical fiber and free space optical (FSO) system may be a possible solution for this problem.

Radar technology integrated with mobile technology: High-precision localization (or location-based service) through communication is one of the functions of the 6G wireless communication system. Accordingly, the radar system will be integrated with the 6G network.

Softwarization and virtualization: Softwarization and virtualization are two important functions which are the bases of a design process in a 5 GB network in order to ensure flexibility, reconfigurability and programmability. Further, billions of devices can be shared on a shared physical infrastructure.

Core Implementation Technology of 6G System

Artificial Intelligence (AI)

Technology which is most important in the 6G system and will be newly introduced is AI. AI was not involved in the 4G system. A 5G system will support partial or very limited AI. However, the 6G system will support AI for full automation. Advance in machine learning will create a more intelligent network for real-time communication in 6G. When AI is introduced to communication, real-time data transmission may be simplified and improved. AI may determine a method of performing complicated target tasks using countless analysis.

Recently, attempts have been made to integrate AI with a wireless communication system in the application layer or the network layer, but deep learning have been focused on the wireless resource management and allocation field. However, such studies are gradually developed to the MAC layer and the physical layer, and, particularly, attempts to combine deep learning in the physical layer with wireless transmission are emerging.

AI-based physical layer transmission means applying a signal processing and communication mechanism based on an AI driver rather than a traditional communication framework in a fundamental signal processing and communication mechanism. For example, channel coding and decoding based on deep learning, signal estimation and detection based on deep learning, multiple input multiple output (MIMO) mechanisms based on deep learning, resource scheduling and allocation based on AI, etc. may be included.

Machine learning may be used for channel estimation and channel tracking and may be used for power allocation, interference cancellation, etc. in the physical layer of DL. In addition, machine learning may be used for antenna selection, power control, symbol detection, etc. in the MIMO system.

Machine learning refers to a series of operations to train a machine in order to create a machine which can perform tasks which cannot be performed or are difficult to be performed by people. Machine learning requires data and learning models. In machine learning, data learning methods may be roughly divided into three methods, that is, supervised learning, unsupervised learning and reinforcement learning.

Neural network learning is to minimize output error. Neural network learning refers to a process of repeatedly inputting training data to a neural network, calculating the error of the output and target of the neural network for the training data, backpropagating the error of the neural network from the output layer of the neural network to an input layer in order to reduce the error and updating the weight of each node of the neural network.

Supervised learning may use training data labeled with a correct answer and the unsupervised learning may use training data which is not labeled with a correct answer. That is, for example, in case of supervised learning for data classification, training data may be labeled with a category. The labeled training data may be input to the neural network, and the output (category) of the neural network may be compared with the label of the training data, thereby calculating the error. The calculated error is backpropagated from the neural network backward (that is, from the output layer to the input layer), and the connection weight of each node of each layer of the neural network may be updated according to backpropagation. Change in updated connection weight of each node may be determined according to the learning rate. Calculation of the neural network for input data and backpropagation of the error may configure a learning cycle (epoch). The learning data is differently applicable according to the number of repetitions of the learning cycle of the neural network. For example, in the early phase of learning of the neural network, a high learning rate may be used to increase efficiency such that the neural network rapidly ensures a certain level of performance and, in the late phase of learning, a low learning rate may be used to increase accuracy.

The learning method may vary according to the feature of data. For example, for the purpose of accurately predicting data transmitted from a transmitter in a receiver in a communication system, learning may be performed using supervised learning rather than unsupervised learning or reinforcement learning.

The learning model corresponds to the human brain and may be regarded as the most basic linear model. However, a paradigm of machine learning using a neural network structure having high complexity, such as artificial neural networks, as a learning model is referred to as deep learning.

Neural network cores used as a learning method may roughly include a deep neural network (DNN) method, a convolutional deep neural network (CNN) method and a recurrent Boltzmman machine (RNN) method. Such a learning model is applicable.

An artificial neural network is an example of connecting several perceptrons.

Referring to FIG. 3, when an input vector $x=(x1, x2, \ldots, xd)$ is input, each component is multiplied by a weight $(W1, W2, \ldots, Wd)$, and all the results are summed. After that, the entire process of applying an activation function $\sigma(\cdot)$ is called a perceptron. The huge artificial neural network structure may extend the simplified perceptron structure illustrated in FIG. 3 to apply the input vector to different multidimensional perceptrons. For convenience of explanation, an input value or an output value is referred to as a node.

The perceptron structure illustrated in FIG. 3 may be described as consisting of a total of three layers based on the input value and the output value. FIG. 4 illustrates an artificial neural network in which the number of (d+1) dimensional perceptrons between a first layer and a second layer is H, and the number of (H+1) dimensional perceptrons between the second layer and a third layer is K, by way of example. FIG. 4 illustrates an example of a structure of a multilayer perceptron.

A layer where the input vector is located is called an input layer, a layer where a final output value is located is called an output layer, and all layers located between the input layer and the output layer are called a hidden layer. FIG. 4 illustrates three layers, by way of example. However, since the number of layers of the artificial neural network is counted excluding the input layer, it can be seen as a total of two layers. The artificial neural network is constructed by connecting the perceptrons of a basic block in two dimensions.

The above-described input layer, hidden layer, and output layer can be jointly applied in various artificial neural network structures, such as CNN and RNN to be described later, as well as the multilayer perceptron. The greater the number of hidden layers, the deeper the artificial neural network is, and a machine learning paradigm that uses the sufficiently deep artificial neural network as a learning model is called deep learning. In addition, the artificial neural network used for deep learning is called a deep neural network (DNN).

The deep neural network illustrated in FIG. 5 is a multilayer perceptron consisting of eight hidden layers+eight output layers. The multilayer perceptron structure is expressed as a fully connected neural network. In the fully connected neural network, a connection relationship does not exist between nodes located at the same layer, and a connection relationship exists only between nodes located at adjacent layers. The DNN has a fully connected neural network structure and is composed of a combination of multiple hidden layers and activation functions, so it can be usefully applied to understand correlation characteristics between input and output. The correlation characteristic may mean a joint probability of input and output. FIG. 5 illustrates an example of a deep neural network.

Based on how the plurality of perceptrons are connected to each other, various artificial neural network structures different from the above-described DNN can be formed.

In the DNN, nodes located inside one layer are arranged in a one-dimensional longitudinal direction. However, in FIG. 6, it may be assumed that w nodes horizontally and h nodes vertically are arranged in two dimensions (convolutional neural network structure of FIG. 6). In this case, since in a connection process leading from one input node to the hidden layer, a weight is given for each connection, a total of h×w weights needs to be considered. Since there are h×w nodes in the input layer, a total of h2w2 weights are required between two adjacent layers.

FIG. 6 illustrates example of a structure of a convolutional neural network

The convolutional neural network of FIG. 6 has a problem in that the number of weights increases exponentially according to the number of connections, so instead of considering the connection of all modes between adjacent layers, it is assumed that a filter having a small size exists. Thus, as shown in FIG. 7, weighted sum and activation function calculations are performed on a portion w % here the filters overlap.

One filter has a weight corresponding to the number as much as the size, and learning of the weight may be performed so that a certain feature on an image can be extracted and output as a factor. In FIG. 7, a filter having a size of 3×3 is applied to the upper leftmost 3×3 area of the input layer, and an output value obtained by performing a weighted sum and activation function operation for a corresponding node is stored in z22.

While scanning the input layer, the filter performs weighted summation and activation function calculation while moving horizontally and vertically by a predetermined interval, and places the output value at the position of the current filter. This method of operation is similar to the convolution operation on images in the field of computer vision, so a deep neural network with this structure is called a convolutional neural network (CNN), and a hidden layer generated as a result of the convolution operation. Is referred to as a convolutional layer. In addition, a neural network in which a plurality of convolutional layers exists is referred to as a deep convolutional neural network (DCNN).

FIG. 7 illustrates an example of a filter operation in a convolutional neural network.

In the convolutional layer, the number of weights may be reduced by calculating a weighted sum by including only nodes located in a region covered by the filter in the node where the current filter is located. Due to this, one filter can be used to focus on features for the local area. Accordingly, the CNN can be effectively applied to image data processing in which the physical distance in the 2D area is an important criterion. Meanwhile, in the CNN, a plurality of filters may be applied immediately before the convolution layer, and a plurality of output results may be generated through a convolution operation of each filter.

Meanwhile, there may be data whose sequence characteristics are important according to data properties. Considering the length variability of the sequence data and the relationship between the sequence data, one element in the data sequence is input at each timestep, and the output vector (hidden vector) of the hidden layer output at a specific time point is input together with the next element in the sequence. The structure applied to the artificial neural network is called a recurrent neural network structure.

Referring to FIG. 8, a recurrent neural network (RNN) is a fully connected neural network with elements (x1(t), x2(t), . . . xd(t)) of any line of sight t on a data sequence. In the process of inputting, the point t−1 immediately preceding is the weighted sum and activation function by inputting the hidden vectors (z1(t−1), z2(t−1), . . . , zH(t−1)) together. It is a structure to be applied. The reason for transferring the hidden vector to the next view in this way is that information in the input vector at the previous views is regarded as accumulated in the hidden vector of the current view.

FIG. 8 illustrates an example of a neural network structure in which a circular loop.

Referring to FIG. 8, the recurrent neural network operates in a predetermined order of time with respect to an input data sequence.

Hidden vectors (z1(1),z2(1), . . . , zH(1)) is input with the input vector (x1(2),x2(2), . . . , xd(2)) of the time point 2, and the vector (z1(2),z2(2), . . . , zH(2)) is determined. This process is repeatedly performed up to the time point 2, time point 3, . . . , time point T.

FIG. 9 illustrates an example of an operation structure of a recurrent neural network.

Meanwhile, when a plurality of hidden layers are disposed in a recurrent neural network, this is referred to as a deep recurrent neural network (DRNN). The recurrent neural network is designed to be usefully applied to sequence data (for example, natural language processing).

As a neural network core used as a learning method, in addition to DNN, CNN, and RNN, Restricted Boltzmann Machine (RBM), deep belief networks (DBN), and deep Q-networks Network), and can be applied to fields such as computer vision, speech recognition, natural language processing, and voice/signal processing.

Federated Learning

In federated learning, one of the distributed machine learning techniques, each of a plurality of devices that are the subject of learning shares a local model parameter with a server, and the server updates global parameters by collecting local model parameters of each of the various devices. Here, the local model parameters may include parameters such as weight or gradient of the local model, and it goes without saying that the local model parameters can be expressed in a variety of ways within the scope that can be interpreted the same or similar to local parameters and regional parameters, etc. When the federated learning techniques are applied to 5G communications or 6G communications, the device may be a user equipment, the server may be a base station, hereinafter, the user equipment/device/transmitter and server/base station/receiver may be used interchangeably for convenience of explanation.

In the above process, since each device does not share raw data with the server, communication overhead in the data transmission process can be reduced, and the personal information of the device (user) can be protected.

FIG. 10 is a diagram illustrating an example of federated learning performed between a plurality of devices and a server.

More specifically, FIG. 10 relates to a federated learning operation process based on orthogonal division access.

The devices 1011, 1012, and 1013 transmit their local parameters to the server 1020 on resources allocated to each of the devices 1011, 1012, and 1013 (1010). At this time, before transmitting the local parameters of the devices 1011, 1012, and 1013, the devices 1011, 1012, and 1013 may first receive configuration information about learning parameters for federated learning from the server 1020. The configuration information about learning parameters for the federated learning may include parameters such as weights or gradients of the local model, and the learning parameters included in local parameters transmitted by devices 1011, 1012, and 1013 may be determined based on the configuration information. After receiving the configuration information, devices 1011, 1012, and 1013 may receive control information for resource allocation for transmission of local parameters. The devices 1011, 1012, and 1013 each may transmit the local parameters on resources allocated based on the control information.

Afterwards, the server 1020 performs offline aggregation 1021 and 1022 on the local parameters received from the devices 1011, 1012, and 1013, respectively.

In general, the server 1020 derives a global parameter through averaging of all local parameters received from the devices 1011, 1012, and 1013 participating in the federated learning, and the derived global parameters are transmitted back to the devices 1011, 1012, and 1013, respectively.

However, in the federated learning operation process based on orthogonal split access, the overhead occurring in terms of wireless resource use is very large (in other words, wireless resources are required linearly as the number of devices participating in learning). Additionally, in the federated learning operation process based on orthogonal split access on limited resources, there may be a problem that the time required to update global parameters is delayed (increased) as the number of devices participating in learning increases.

FIG. 11 is a diagram illustrating another example of federated learning performed between a plurality of devices and a server.

More specifically, FIG. 11 relates to a federated learning operation process based on Over-the-Air (OTA) calculation. The OTA calculation may be briefly referred to as Aircomp.

The AirComp-based federated learning method is a method in which all devices participating in federated learning each transmit local parameters through the same resource. Through the AirComp-based federated learning, illustrated in FIG. 10, as the number of devices participating in learning increases, the problem of delay in the time required to update global parameters can be solved.

In FIG. 11, devices 1111, 1112, and 1113 transmit their local parameters to the server 1120 on the same allocated resources 1110. At this time, operations (receiving configuration information and receiving control information) performed before local parameter transmission of devices 1111, 1112, and 1113 and before local parameter transmission described in FIG. 17 may be performed in the same manner in FIG. 11.

Local parameters transmitted by the devices 1111, 1112, and 1113 are transmitted based on analog or digital methods. Here, the analog method simply means that pulse amplitude modulation (PAM) is applied to a gradient value, and the digital method means that a typical digital modulation method, quadrature amplitude modulation (QAM) or phase shift keying (PSK), is applied to the gradient value. The server 1120 can obtain sum 1121 of local parameters transmitted based on the analog or digital method received by superposition on the air. Afterwards, the server 1120 derives global parameters by averaging all local parameters and transmits the derived global parameters back to the devices 1111, 1112, and 1113, respectively.

In AirComp-based federated learning, the devices participating in the federated learning each transmit local parameters through the same resource, so the number of devices participating in learning does not significantly affect latency. In other words, even if the number of devices participating in the federated learning increases, the time required to update global parameters does not change significantly compared to the case where the number of devices is small. Therefore, the AirComp-based federated learning can be efficient in terms of wireless resource management.

However, in the case of AirComp-based federated learning, it is difficult to apply the typical channel coding method because the UEs participating in the federated learning use non-orthogonal multiple access, which causes excessive transmission power consumption of the UEs to ensure reception reliability. The UEs participating in the federated learning consume power while performing many computing operations during the learning process, and the additional occurrence of excessive transmission power consumption to ensure reception reliability can be a significant burden on the UEs. The present disclosure proposes a method for a plurality of UEs to perform the federated learning to solve these problems. More specifically, the present disclosure proposes a transmission and reception method (federated learning method) for handling an aggregated codeword. Here, the aggregated codeword may mean a codeword in the form of overlapping codewords for local parameters transmitted by a plurality of UEs participating in the federated learning.

Finite Field Definition

Before explaining the federated learning method proposed in the present disclosure, it is described the definition of a finite field.

A set $\mathbb{F}$ composed of arbitrary finite elements that satisfy the following four properties is defined as a finite field.

1) In the set $\mathbb{F}$, addition and multiplication are defined.
2) The commutative law/combination law/distribution law is valid for addition/multiplication.
3) There is an identity 0 of addition, and inverses of addition exist for all elements f of the set $\mathbb{F}$.
4) There is an identity 1 for multiplication, and inverses for multiplication exist for all elements f of the set $\mathbb{F}$.

The finite field that satisfies the definition described above can be constructed according to two methods. More specifically, the finite field may be configured in different ways for the case where the value of Q, which indicates the order of the finite field, is a prime number, and the case where the value of Q is the prime number to the power of n, which is more than 1.

(1) When Q is a Prime Number

When the value of Q indicating the order of the finite field is a prime number, the finite field is defined based on the integer modulo-Q operation. For example, when Q is 2 or 3, addition/multiplication of finite fields $\mathbb{F}_2=\{0,1\}$ and $\mathbb{F}_3=\{0,1,2\}$ can be defined as shown in Tables 2 and 3 below.

TABLE 2

| + | 0 | 1 | × | 0 | 1 |
|---|---|---|---|---|---|
| 0 | 0 | 1 | 0 | 0 | 0 |
| 1 | 1 | 0 | 1 | 0 | 1 |

TABLE 3

| + | 0 | 1 | 2 | × | 0 | 1 | 2 |
|---|---|---|---|---|---|---|---|
| 0 | 0 | 1 | 2 | 0 | 0 | 0 | 0 |
| 1 | 1 | 2 | 0 | 1 | 0 | 1 | 2 |
| 2 | 2 | 0 | 1 | 2 | 0 | 2 | 1 |

(2) when $Q=q^n$ and q is a Prime Number

When $Q=q^n$, no finite fields are defined based on integer modulo-Q operations. In this case, the finite field may be defined by extending the field defined in $q^m$ for $m\in\{1\le m<n|n/m$ is an integer$\}$. More specifically, the information field that is $Q=q^n$ can be defined by extending a primitive polynomial over $GF(q^m)$] for $GF(q^m)$ with Degree-n/m) is from a finite field defined in $GF(q^m)$. Here, the primitive polynomial over $GF(q^m)$ for $GF(q^m)$ with Degree-(n/m) is defined as follows.

An irreducible polynomial with Degree-(n/m) (a polynomial that is not expressed as a product of polynomials of lower order) satisfies condition "dividing up $z^Q+1$, where the smallest Q is $q^n$."

The GF(Q) field configured based on the primitive polynomial for $GF(q^m)$, with Degree-(n/m), can be expressed as $\mathbb{F}_{Q,q^m}$. For example, when $Q=2^4$, the GF(16) field can be configured by extending the primitive polynomial over GF(2) with Degree-4 or the primitive polynomial over GF(4) with Degree-2, and can be expressed as $\mathbb{F}_{16,2}$ and $\mathbb{F}_{16,4}$, respectively. Tables 3 and 4 below show the primitive polynomials for GF(2) with Degree-4 and the primitive polynomials for GF(4) with Degree-2 as $\mathbb{F}_{16,2}$ and $\mathbb{F}_{16,4}$, respectively. More specifically, Table 3 above is the $\mathbb{F}_{16,2}$ using the primitive polynomial $p(z)=1+z+z^4$(over GF(2)) for GF(2), and Table 4 above is the $\mathbb{F}_{16,4}$ using the primitive polynomial $p(z)=2+z+z^2$(over GF(4) for GF(4).

TABLE 4

| symbol | polynomial | Binary vector |
|---|---|---|
| 0 | 0 | 0000 |
| $\alpha^0$ | 1 | 0001 |
| $\alpha^1$ | z | 0010 |
| $\alpha^2$ | $z^2$ | 0100 |
| $\alpha^3$ | $z^3$ | 1000 |
| $\alpha^4$ | $z+1$ | 0011 |
| $\alpha^5$ | $z^2+z$ | 0110 |
| $\alpha^6$ | $z^3+z^2$ | 1100 |
| $\alpha^7$ | $z^3+z+1$ | 1011 |
| $\alpha^8$ | $z^2+1$ | 0101 |
| $\alpha^9$ | $z^3+2$ | 1010 |
| $\alpha^{10}$ | $z^2+z+1$ | 0111 |
| $\alpha^{11}$ | $z^3+z^2+2$ | 1110 |
| $\alpha^{12}$ | $z^3+z^2+z+1$ | 1111 |
| $\alpha^{13}$ | $z^3+z^2+1$ | 1101 |
| $\alpha^{14}$ | $z^3+1$ | 1001 |

TABLE 5

| symbol | polynomial | Binary vector |
|---|---|---|
| 0 | 0 | 00 |
| $\alpha^0$ | 1 | 01 |
| $\alpha^1$ | z | 10 |
| $\alpha^2$ | $z+2$ | 12 |
| $\alpha^3$ | $3z+2$ | 32 |
| $\alpha^4$ | $z+1$ | 11 |
| $\alpha^5$ | 2 | 02 |
| $\alpha^6$ | $2z$ | 20 |
| $\alpha^7$ | $2z+3$ | 23 |
| $\alpha^8$ | $z+3$ | 13 |
| $\alpha^9$ | $2z+2$ | 22 |
| $\alpha^{10}$ | 3 | 03 |
| $\alpha^{11}$ | $3z$ | 30 |
| $\alpha^{12}$ | $3z+1$ | 31 |
| $\alpha^{13}$ | $2z+1$ | 21 |
| $\alpha^{14}$ | $3z+3$ | 33 |

Before explaining the proposals proposed in the present disclosure, let us define rules according to expression methods such as formulas used to explain the proposals. Characters expressed such as x, x, X and $\mathbb{X}$ mean scalar, vector, matrix, and set, respectively, in that order. Additionally, x[i] indicates the i th entry of vector x and indicates $$[x[i]]_{i=m}^n = [x[m], x[m+1], \ldots, x[n]].$$

Additionally, $(\ )_q$ means modulo-q operation. $\mathbb{N}$ and $\mathbb{N}_Q$ means a set of all natural numbers and a set of natural numbers smaller than Q. |x| indicates the absolute value of x, and |x| indicates the cardinality of the set of x. Lastly, it means $\beta(a)=1$ if $a\ge0$ or 0 otherwise, and $0_n$ means all zero vector with length n.

Extendable Q-Ary Linear Code Transmission and Reception Technique Based on Information Field Restrictions Hereinafter, the extendable Q-ary linear code transmission and reception technique based on information field restrictions proposed in the present disclosure will be described.

Hereinafter, in the extendable Q-ary linear code transmission and reception technique based on information field restrictions proposed in the present disclosure, it is assumed that power adjustment to maximize the efficiency of the federated learning has been performed on the UEs participating in the federated learning. Here, during the federated learning, the reception signal at the server (base station) is in the form of (channel+transmission power) of the weight-sum of signals transmitted by devices participating in the federated learning, and at this time, since the signals must have uniform weights to achieve the effect of increasing the batch size by the number of the UEs participating in the federated learning, power adjustment to maximize the efficiency of the federated learning is performed on the UEs participating in the federated learning.

Power adjustment to maximize the efficiency of the federated learning can be performed based on the following three methods.

1) The server (base station) performs grouping of the UEs based on CSI information received from the UEs participating in the federated learning, and fine-tuning of transmission power for The UEs belonging to the same group. Based on the fine tuning, the server can have uniform (same) received power sensitivity for signals received from the UEs belonging to the same group. At this time, a representative channel value is predefined for each UE group, and fine adjustment of the power is performed using a function of the channel value between each UE and the server (receiver).

2) When wireless resource management efficiency is prioritized, the server (base station/receiver) adjusts the transmission power of all UEs based on reception signal sensitivity of the signal transmitted at maximum power by the UE related to worst channel among the channels between UEs participating in the federated learning and servers. That is, the transmission power of all UEs is adjusted so that the reception signal sensitivity at the server of a signal transmitted by UEs other than those related to the worst channel is the same as the reception signal sensitivity at the server of a signal transmitted at maximum power by the UE related to the worst channel. To adjust transmission power like this, the server (base station/receiver) first reports information about the worst channel to the UEs before the UEs participating in the federated learning transmit information (transmit local parameters for the federated learning).

3) When power efficiency is prioritized for each UE participating in the federated learning, the UEs participating in the federated learning transmit signals based on their respective maximum power, and the server (base station/receiver) adjusts the transmission power of all UEs based on the reception signal sensitivity of the signal transmitted at maximum power by the UE related to the best channel among the channels between the UEs participating in the federated learning and the server. That is, the transmission power of all UEs is adjusted so that the reception signal sensitivity at the server of a signal transmitted by UEs other than those related to the best channel is the same as the reception signal sensitivity at the server of a signal transmitted at maximum power by the UE related to the best channel. To adjust transmission power like this, the server (base station/receiver) first reports information about the best channel to the UEs before the UEs participating in the federated learning transmit (transmit local parameters for the federated learning) information, and based on the report, the UEs adjust the number of retransmissions and the retransmission power level, respectively.

Hereinafter, power adjustment was performed on the UEs participating in the federated learning based on at least one of the three methods described above, and it is assumed that the server (receiver) receives signals from each UE with the same reception sensitivity.

In order for the server to successfully perform demodulation of the aggregated codeword transmitted from the UEs participating in the federated learning, the following two conditions must be satisfied.

Condition 1: Aggregated codeword must be mapped to another codeword.

Condition 2: Although the code field and the channel field on the air are different, the aggregated result must be equivalent.

The condition 1 can be achieved by restricting the order of the information field of the UE performing the federated learning. The information field may be for local parameter transmission. The UEs participating in the federated learning can receive information related to the order limit of the information field from the server before transmitting local parameters.

The condition 2 can be achieved by restricting the finite field order set used for AirComp to prime numbers p and $p^i$ for $i \geq 1$.

Through restrictions on the Q-ary linear code, the process of transforming a Q-ary linear code with an unrestricted order into an extendable Q-ary linear code with a restricted order is summarized in Table 6 below.

TABLE 6

|  | Q = prime number | $Q = q^2$ where $q = p^i$ for $i \in \mathbb{N}$ and p is prime number |
|---|---|---|
| General Q-ary linear code | $i \in \mathbb{Z}_{*Q}^k \mapsto c \in \mathbb{Z}_{*Q}^n$ with $H \in \mathbb{Z}_{*Q}^{m \times n}$ | $i \in \mathbb{F}_{Q,q}^{*k} \mapsto c \in \mathbb{F}_{Q,q}^{*n}$ with $H \in \mathbb{F}_{Q,q}^{*m \times n}$ |
| Information restriction | $i_u \in \mathbb{Z}_{*Q}^k \mapsto i_u \in \mathbb{Z}_{*T}^k$ where $T = \dfrac{Q'}{U}$ and $Q' < Q$ | $i_u \in \mathbb{F}_{Q,q}^{*k} \mapsto i_u \in$ $\{0(0, 0), 1(0, 1), z(1, 0), \dots ,$ $(q-1)z + q - 1(q-1, q-1)\}$ |
| Aggregation | $c \equiv \left(\sum_{u=1}^{U} c_u\right)_Q =$ $[(c_1[n] + \dots + c_U[n])_Q]_{n=1}^{N}$ | $c \equiv \left(\sum_{u=1}^{U} c_u\right) \bmod \mathbb{F}_{Q,q}^* =$ $[(c_1[n] + \dots + c_U[n]) \bmod \mathbb{F}_{Q,q}^*]_{n=1}^{N}$ |

TABLE 6-continued

| Q = prime number | $Q = q^2$ where $q = p^i$ for $i \in \mathbb{N}$ and p is prime number |
|---|---|
| | where $(c_1[n] + \ldots + c_U[n]) \bmod \mathbb{F}_{Q,q} = \left(\sum_{u=1}^{U} a_{u,0}[n]\right)_q + z\left(\sum_{u=1}^{U} a_{u,1}[n]\right)_q$ |
| Wireless channel | $s \equiv \sum_{u=1}^{U} s_u = [s_1[n] + \ldots + s_U[n]]_{n=1}^{L}$ |

Here, Q indicates the order of the information field for generating local parameters. In Table 6, the second column relates to a case where the order of the information field is a prime number, and the third column relates to a case where the order of the information field is p, which is a prime number, to the power of 2i. Here, i is a natural number.

The second row of Table 6 shows the process of restricting the order of the information field using a formula. When the order of the information field is a prime number (column 2), the information field of order Q is configured as an order restricted information field, and an order of the order restricted information field becomes T. As previously described for the definition of a finite field, the information field in the case of $Q=q^n$ can be extended using a primitive polynomial over $GF(q^m)$ with Degree-(n/m). Therefore, w % ben the order of the information field is p, which is a prime number, to the power of 2i (column 3), in Table 5 above, n=2i and m=i, so an order unrestricted information field can be defined by extending it using a primitive polynomial over GF(q) with a restricted Degree-2. That is, the GF(Q) field may be restricted to a GF(Q) field with Degree-2.

The third row of Table 6 shows a process of aggregating codewords generated based on the encoding of the UEs participating in the federated learning using a formula.

The fourth row of Table 6 shows a process by which modulated codewords are transmitted on a channel using a formula, and $s[n]=\mathcal{M}(c[n])$ stands for modulated symbol. Here, when transmitting a modulation symbol, the degree of freedom (dof) of an available orthogonal channel is 2 (I-channel/Q-channel). That is, modulation can be performed based on both the real number domain [I-channel] and the imaginary number domain [Q-channel] on the complex domain in which modulation is performed.

When Q=prime number, the addition of symbols is trapped in modulo-Q. That is, the result of adding symbols is within an integer value from 0 to Q−1. Aggregation modulo-Q operation does not occur in an actual wireless channel environment, but no problem occurs because no information is lost. When Q=prime number, the degree of the aggregation component is 1 and the available orthogonal channel dof is 2, so during modulation, either a method using only I-channels or a method using I/Q-channels can be used.

When $Q=q^2$, where $q=p^i$ for $i \in \mathbb{N}$, and p is prime number, while performing polynomial-based field construction, the addition of symbols is trapped in the modulo-q operation between polynomial components. The number of polynomial components is equivalent to the degree of the polynomial. If the degree of the polynomial is greater than 2, multiple polynomial components are modulated in one channel, making it difficult to guarantee orthogonality between components when aggregating. In other words, ambiguity occurs in which combinations of different polynomial components are observed with the same symbol. In other words, if the results of the combination of different multiple polynomial components are the same, it is impossible to determine the multiple polynomial components that make up the combination of components. Therefore, if the order Q of the field is not a prime number, if a GF(Q) finite field is configured by extending the degree-$GF(p^i)$ primitive polynomial finite field based on a finite field configured as $GF(p^i)$, the GF(Q) finite field has degree-2 polynomial over $GF(p^i)$ as polynomial components. Therefore, when a modulated symbol is transmitted to the receiver using an I/Q channel for each component that configures the GF(Q) finite field configured by extending the degree-2 polynomial for $GF(p^i)$, ambiguity does not occur at the receiver.

Modulation Method—Proposal 1

This proposal relates to a method of modulating codewords generated based on encoding of UEs participating in federated learning.

The information part and parity part generated from the restricted information field are modulated based on different modulation orders. Here, the information part may be called a systematic information part, systematic bit part, etc. More specifically, the UEs participating in the federated learning receive restriction information related to order restrictions on information fields for generating local parameters for performing the federated learning from the server. Thereafter, the UEs each perform encoding on local parameters generated from an order restricted information field based on the restriction information, and the encoded local parameters consist of a systematic bit part and a parity part. Next, the UEs each perform modulation on the encoded local parameters, and the systematic bit part and the panty part are modulated based on different modulation orders. In other words, different modulation methods are applied to the systematic bit part and the parity part.

Hereinafter, methods of applying different modulation methods to the systematic bit part and the parity part will be described for (i) a case where Q=prime number and (ii) a case where $Q=q^2$, where $q=p^i$ for $i \in \mathbb{N}$, and p is prime number, respectively.

(Proposal 1-1) when Q=Prime Number

For the order Q of a given information field, the number U of UEs (users) that can participate in federated learning satisfies $U \in \{1, \ldots, Q-1\}$. At this time, the available field order Q* of each UE according to the number of UEs can be expressed as Equation 1 below.

$$Q^* = \begin{cases} \lfloor Q/U \rfloor + 1, & \text{if } 1 < U \le Q-1, \\ Q, & \text{else,} \end{cases} \qquad \text{[Equation 1]}$$

In the above equation, $\lfloor \ \rfloor$ indicates the floor function. Here, the restricted information field order $Q_1$ of each UE may be determined as one of the values from 1 to Q*. In other words, the restricted information field order value may be determined based on the number of the plurality of UEs participating in the federated learning.

(Proposal 1-1-a) Modulation Using I-Channel Only

As described above, modulation may be performed based on both the real number domain [I-channel] and the imaginary number domain [Q-channel] on the complex domain in which modulation is performed. This proposal relates to a method of performing modulation using only the real number domain among the real number and imaginary number domains on the complex domain.

When modulation is performed using only the real number domain among the real number and imaginary number domains on the complex domain, given an information field with order Q and an order restricted information field with order $Q_1$, the modulated symbols of the systematic information part and parity part can be expressed as Equation 2 below.

$$s_u[n] = \mathcal{M}(c_u[n]) = c_u[n] - b \qquad \text{[Equation 2]}$$

$$\text{where, } b = \begin{cases} \dfrac{\sum_{i=0}^{Q-1} i}{Q}, & \text{if parity part,} \\ \dfrac{\sum_{i=0}^{Q_1-1} i}{Q_1}, & \text{if systematic bit part.} \end{cases}$$

The b indicates the modulation offset used for modulation of the systematic bit part and parity part. Looking at Equation 2 above, it can be seen that different modulation offset values are used when modulating the systematic bit part and parity part. In other words, the modulation is performed by applying differently modulation offset values used for the modulation to the systematic bit part and the parity part. More specifically, the modulation offset value for the systematic bit part is determined based on Q1, which is the order value of the order restricted information field, and the modulation offset value for the parity part is determined based on Q, which is the order value of the order unrestricted information field.

The UEs participating in the federated learning each perform modulation on (i) the systematic bit part related to local parameters and (ii) the parity part, and the modulated systematic bit part and parity part of each of the UEs are aggregated. The result of aggregating the modulated systematic bit part and parity part of each of the UEs can be expressed as Equation 3 below.

$$\sum_{u=1}^{U} s_u[n] = \sum_{u=1}^{U} \mathcal{M}(c_u[n]) = \sum_{u=1}^{U} c_{u,0}[n] - Ub \qquad \text{[Equation 3]}$$

Here, U indicates the number of the UEs participating in the federated learning, the UEs participating in the federated learning each can be assigned to a UE index, and u may correspond to the UE index of each of the UEs.

(Proposal 1-1-b) Modulation Using I/Q-Channels

This proposal relates to a method of performing modulation using both real number and imaginary number domains on the complex domain.

When modulation is performed using both the real number and imaginary number domains on the complex domain, given an information field with order Q and an order restricted information field with order $Q_1$, the modulated symbols of the systematic information part and parity part can be expressed as Equation 4 below.

$$s_u[n] = \qquad \text{[Equation 4]}$$

$$\mathcal{M}(t(c_u[n])) = \mathcal{M}((t_{u,0}[n], t_{u,1}[n])) = t_{u,0}[n] - b + j(t_{u,1}[n] - b)$$

Here, $t_{u,0}[n]$ indicates the modulation symbol on the real number domain of the encoded systematic bit part and parity part, $t_{u,1}[n]$ indicates the modulation symbol on the imaginary number domain of the encoded systematic bit part and parity part, and b indicates the modulation offset in the real number and imaginary number domains. Hereinafter, the modulation symbol on the real number domain and the modulation symbol on the imaginary number domain may be used to refer to the real number part value of the modulation symbol and the imaginary number part value of the modulation symbol.

$t_{u,0}[n]$ indicating the modulation symbol on the real number domain of the encoded (i) systematic bit part and (ii) parity part can be expressed as Equation 5 below.

$$t_{u,0}[n] = \begin{cases} \left\lfloor \dfrac{c_u[n]}{\lceil \sqrt{Q} \rceil} \right\rfloor, & \text{if parity part,} \\ \left\lfloor \dfrac{c_u[n]}{\lceil \sqrt{Q_1} \rceil} \right\rfloor, & \text{if systematic bit part} \end{cases} \qquad \text{[Equation 5]}$$

More specifically, the modulation symbols on the real number domain of the systematic bit part and the parity part may be configured based on different methods. That is, the modulation symbol on the real number domain of the systematic bit part is determined based on Q1, which is the order value of the order restricted information field, and the modulation symbol on the real number domain of the parity part is determined based on Q, which is the order value of the order unrestricted information field. In Equation 5 above, $\lceil \ \rceil$ indicates a ceiling function, and $\lfloor \ \rfloor$ indicates a floor function.

$t_{u,1}[n]$ indicating the modulation symbol on the imaginary number domain of the encoded (i) systematic bit part and (ii) panty part can be expressed as Equation 6 below.

$$t_{u,1}[n] = \begin{cases} (c_u[n])_{\lceil \sqrt{Q} \rceil}, & \text{if parity part,} \\ (c_u[n])_{\lceil \sqrt{Q_1} \rceil}, & \text{if systematic bit part} \end{cases} \qquad \text{[Equation 6]}$$

More specifically, the modulation symbols on the imaginary number domain of the systematic bit part and the parity part may be configured based on different methods. That is, the modulation symbol on the imaginary number domain of the systematic bit part is determined based on Q1, which is the order value of the order restricted information field, and the modulation symbol on the imaginary number domain of the parity part is determined based on Q, which is the order value of the order unrestricted information field. In Equation 6 above, $\lceil \ \rceil$ indicates a ceiling function, $$(c_u[n])_{\lceil \sqrt{Q} \rceil}$$

indicates the modulo operation of $c_u[n]$ with $\lceil \sqrt{Q} \rceil$, and the $$(c_u[n])_{\lceil \sqrt{Q_1} \rceil}$$

indicates the modulo operation of the $c_u[n]$ with $\lceil\sqrt{Q_1}\rceil$.

$$b = \begin{cases} \dfrac{\sum_{i=0}^{\lceil\sqrt{Q}\rceil-1} i}{\lceil\sqrt{Q}\rceil}, & \text{if parity part,} \\[2ex] \dfrac{\sum_{i=0}^{\lceil\sqrt{Q_1}\rceil-1} i}{\lceil\sqrt{Q_1}\rceil}, & \text{if systematic part} \end{cases} \quad \text{[Equation 7]}$$

The b indicates the modulation offset used for modulation of the systematic bit part and parity part. Looking at Equation 7 above, it can be seen that different modulation offset values are used when modulating the systematic bit part and parity part. In other words, the modulation is performed by applying differently modulation offset values used for the modulation to the systematic bit part and the parity part. More specifically, the modulation offset value for the systematic bit part is determined based on Q1, which is the order value of the order restricted information field, and the modulation offset value for the parity part is determined based on Q, which is the order value of the order unrestricted information field.

The UEs participating in the federated learning each perform modulation on (i) the r systematic bit part related to local parameters and (ii) the parity part, and the modulated systematic bit part and parity part of each of the UEs are aggregated. The result of aggregating the modulated systematic bit part and parity part of each of the UEs can be expressed as Equation 8 below.

$$\sum_{u=1}^{U} s_u[n] = \quad\text{[Equation 8]}$$
$$\mathcal{M}(c_u[n]) = \sum_{u=1}^{U} t_{u,0}[n] - Ub + j\left(\sum_{u=1}^{U} t_{u,1}[n] - Ub\right)$$

Here, U indicates the number of the UEs participating in the federated learning, the UEs participating in the federated learning each can be assigned to a UE index, and u may correspond to the UE index of each of the UEs.

In summary, when the modulation is performed using both the real number and is imaginary number domains on the complex domain, the modulation for the systematic bit part and the parity part is performed by applying differently a modulation offset value used for the modulation to the systematic bit part and the panty part. The modulation is performed by applying differently (i) a way in which a modulation symbol for the systematic bit part is mapped onto the complex domain, and (ii) a way in which a modulation symbol for the parity part is mapped onto the complex domain.

The modulation offset value for the systematic bit part is determined based on the order value of the order restricted information field, and the modulation offset value for the parity part is determined based on the order value of the order unrestricted information field.

The way in which the modulation symbol for the systematic bit part is mapped onto the complex domain is determined based on the order value of the order restricted information field, and the way in which the modulation symbol for the parity part is mapped onto the complex domain is determined based on the order value of the order unrestricted information field.

(Proposal 1-2) when $Q=q^2$, where $q=p^i$ for $i\in\mathbb{N}$, and p is Prime Number, [where, $\mathbb{N}$ is a Set of Natural Numbers]

For the order Q of a given information field, the number U of UEs (users) that can participate in federated learning satisfies $U\in\{1,\ldots,q-1\}$. At this time, the available field order Q* of each UE according to the number of UEs can be expressed as Equation 9 below.

$$Q^* = \begin{cases} (\lfloor q/U \rfloor + 1)^2, & \text{if } 1 < U \leq q-1, \\ q^2, & \text{else,} \end{cases} \quad\text{[Equation 9]}$$

The order value of the order restricted information field may be determined based on the number of the UEs participating in the federated learning. Here, the restricted information field order $Q_1$ of each UE can satisfy $Q_1\in\{i^2$ for $i\in(1,\ldots,Q^*)\}$.

When $c_u[n]=a_{u,0}[n]+za_{u,1}[n]$, which is a degree-2 polynomial, the modulation symbols of the systematic information part and parity part can be expressed as Equation 10 below.

$$s_u[n] = \mathcal{M}(c_u[n]) = a_{u,0}[n] - b + j(a_{u,1}[n] - b) \quad\text{[Equation 10]}$$

$$\text{where, } b = \begin{cases} \dfrac{\sum_{i=0}^{q-1} i}{q}, & \text{if parity part,} \\[2ex] \dfrac{\sum_{i=0}^{Q^*-1} i}{Q^*}, & \text{if systematic bit part.} \end{cases}$$

The b indicates the modulation offset used for modulation of the systematic bit part and parity part. Looking at Equation 10 above, it can be seen that different modulation offset values are used when modulating the systematic bit part and parity part. In other words, the modulation is performed by applying differently modulation offset values used for the modulation to the systematic bit part and the panty part. More specifically, the modulation offset value for the systematic bit part is determined based on Q*, which is the order of the available information field of each UE participating in the federated learning, and the modulation offset value for the parity part is determined based on a value corresponding to p, which is a prime number, to the power of i (i.e. $q=p^i$).

FIGS. 12 to 17 illustrate examples in which a modulation method proposed in the present disclosure is performed.

First, FIG. 12 illustrates an example of a modulation symbol (constellation) formed on an individual transmitter (UE) side. More specifically, FIG. 12 relates to a case where is the order of the information field is 7, the order of the information field is restricted to 3, and modulation is performed based only on the real number domain on the complex domain. 1210 indicates the modulation symbol for the systematic bit part, and 1220 indicates the modulation symbol for the parity part. It can be seen that modulation offset value 1 is applied to the systematic bit part based on Equation 2 above, and modulation offset value 3 is applied to the parity part based on Equation 2 above.

Next, FIG. 13 illustrates an example in which modulation symbols of each UE in FIG. 12 are aggregated and received at the receiver (server) side. More specifically. FIG. 13 relates to a case where the order of the information field is 7, the order of the information field is restricted to 3, the number of UEs participating in federated learning is 2, and modulation is performed based only on the real number domain on the complex domain. 1310 indicates that the modulation symbols for the systematic bit part are aggregated, and 1320 indicates that the modulation symbols for the parity part are aggregated.

FIG. 14 illustrates an example of a modulation symbol formed on an individual transmitter (UE) side. More specifically. FIG. 14 relates to a case where the order of the information field is 7, the order of the information field is restricted to 3, and modulation is performed based on both the real number and imaginary number domains on the complex domain. 1410 indicates a modulation symbol for the systematic bit part, and 1420 indicates a modulation symbol for the parity part. The real number part modulation symbol for the systematic bit part and the parity bit part is configured based on Equation 5 above, and the imaginary number part modulation symbol for the systematic bit part and parity bit part is configured based on Equation 6 above. Additionally, it can be seen that a modulation offset value of 0.5 is applied to the systematic bit part based on Equation 7 above, and a modulation offset value of 1 is applied to the parity part based on Equation 7 above.

Next, FIG. 15 illustrates an example in which the modulation symbols of each UE in FIG. 14 are aggregated and received at the receiver (server). More specifically, FIG. 15 relates to the case where the order of the information field is 7, the order of the information field is restricted to 3, the number of UEs participating in federated learning is 2, the modulation is performed based on both the real number and imaginary number domains on the complex domain. 1510 indicates that the modulation symbols for the systematic bit part are aggregated, and 1520 indicates that the modulation symbols for the parity part are aggregated.

FIG. 16 illustrates an example of a modulation symbol formed on an individual transmitter (UE) side. More specifically, FIG. 16 relates to a case where the order of the information field is 16, the order of the information field is restricted to 4, and modulation is performed based on both the real number and imaginary number domains on the complex domain. 1610 indicates the modulation symbol for the systematic bit part, and 1620 indicates the modulation symbol for the parity part. The modulation symbols for the systematic bit part and parity bit part are configured based on Equation 10 above. Additionally, it can be seen that the modulation offset value of 0.5 is applied to the systematic bit part based on Equation 10 above, and the modulation offset value of 0.5 is applied to the panty part based on Equation 10 above.

Next, FIG. 17 illustrates an example in which modulation symbols of each UE in FIG. 16 are aggregated and received at the receiver (server). More specifically, FIG. 17 relates to a case where the order of the information field is 16, the order of the information field is restricted to 4, the number of UEs participating in federated learning is 2, and the modulation is performed based on both real number and imaginary number domains on the complex domain. 1710 indicates that the modulation symbols for the systematic bit part are aggregated, and 1720 indicates that the modulation symbols for the parity part are aggregated.

Looking at the results of FIGS. 12 to 17, (i) in case of Q=prime number and using only I-channel and (ii) in case of Q=q$^2$, where q=p$^i$ for i$\in \mathbb{N}$, and p is prime number and using all I/Q channels, since only the modulation offset value is used when modulating, it can be seen that the aggregated modulation symbols at the receiver appear in a simple extended form of the individual modulation symbols at the transmitter. Here, the modulation by applying only the modulation offset value may be referred to as biased amplitude modulation. At this time, in the systematic bit part, different symbols indicate different constellations. On the other hand, it can be seen that the parity part is repeated during modulo operation to form a constellation, and for rows/columns, constellations are observed in the form of circulation through modulo operations corresponding to each field.

In addition, when Q=prime number and using all I/Q-channels, because the parity part applies a modulation offset value to the I/Q channel (biased amplitude modulation) by using the quotient and remainder for $\sqrt{Q}$ at a specific divider value during modulation, the modulation symbol (constellation) of the aggregated parity part at the receiver is extended into a complex form. The complex symbol s[n] and the corresponding value q̃ on the field have a relationship of q̃=(real(s[n])⌈$\sqrt{Q}$⌉+imag(s[n]))$_Q$. On the other hand, because the systematic bit part applies a modulation offset value to the I/Q channel (biased amplitude modulation) by using the quotient and remainder for $\sqrt{Q_1}$ at a specific divider value during modulation, the modulation symbols of the aggregated systematic bit part at the receiver are extended into complex forms. The complex symbol s[n] and the corresponding value q on the field have a relationship of q̃=(real (s[n]) $\sqrt{Q_1}$+imag(s[n]))$_{Q_1}$.

Demodulation Method—Proposal 2

This proposal relates to a server demodulation method for the aggregated codeword transmitted from UEs participating in federated learning. For decoding of the aggregated codeword, both maximum-likelihood (ML) decoding and belief propagation (BP) decoding are applicable. Therefore, in this proposal, the demodulation method performed before decoding will be described. When a UE (User) U participating in federated learning transmits local parameters based on AirComp, the constellation hypothesis size for demodulation can be organized as shown in Table 7 below.

TABLE 7

| | | Q = prime number | Q = q$^2$ where q = p$^i$ for i $\in \mathbb{N}$ and p is prime number |
|---|---|---|---|
| Hypothesis size (systematic information) | I-channel | $U(Q_1 - 1) + 1 \leq Q$ | $(U(\sqrt{Q_1} - 1) + 1)^2 \leq Q$ |
| | I/Q-channel | $(U(\lceil \sqrt{Q_1} \rceil - 1) + 1)^2 - \frac{U(U+1)}{2}(\lceil \sqrt{Q_1} \rceil^2 - Q_1)$ | |
| Hypothesis size (parity part) | I-channel | $U(Q - 1) + 1$ | $(U(q - 1) + 1)^2$ |
| | I/Q-channel | $(U(\lceil \sqrt{Q} \rceil - 1) + 1)^2 - \frac{U(U+1)}{2}(\lceil \sqrt{Q} \rceil^2 - Q)$ | |

Here, Q indicates the order of the information field for generating local parameters. In Table 5 above, the second column relates to the case where the order of the information field is a prime number, and the third column relates to the case where the order of the information field is p, which is a prime number, to the power of 2i. Here, i is a natural number.

In both cases where the order Q of the information field is a prime number and where the order of the information field is p, which is a prime number, to the power of 2i, systematic information part may have a hypothesis size equal to or smaller than the information field order Q due to the effect of information field restrictions, and since circulation does not occur, high reliability can be guaranteed. Therefore, in the case of the systematic information part, demodulation is performed on all observed constellation points, and demodulation is performed by extracting a soft-value corresponding to each symbol.

On the other hand, in the case of the parity part, since an individual codeword each generated by UEs participating in federated learning is confined in the Q-ary field, part of the constellation has the form of being repeated and extended. Therefore, in the case of the parity part, based on the repeated constellation characteristic, a window is applied from a specific point of the reception signal to reduce the search space, and demodulation is performed by extracting the soft-value for each symbol.

FIGS. 18 and 19 illustrate examples in which a demodulation method proposed in the present disclosure is performed.

First, FIG. 18 relates to a case in which demodulation on systematic bit part is performed. More specifically, FIG. 18 relates to a case where the order of the information field is 16, the order of the information field is restricted to 4, the number of UEs participating in federated learning is 3, and a reception signal is received based on modulation in which both the real number and imaginary number domains on the complex domain are used. Referring to FIG. 18, 1810 indicates a modulation symbol for the systematic bit part transmitted by each UE participating in federated learning. At 1820 in FIG. 18, the receiver (server) receives the reception signal 1821 and performs probability calculation on it. The systematic bit part is modulated based on information field restriction, so that the hypothesis size is equal to or less than the information field order Q. Therefore, in FIG. 18, the receiver (server) performs demodulation on all observed modulation symbol (or constellation) points and extracts the soft-value corresponding to each symbol.

Next, FIG. 19 relates to a case where demodulation on the parity part is performed. More specifically, FIG. 19 relates to a case where the order of the information field is 16, the order of the information field is restricted to 4, the number of UEs participating in federated learning is 3, and a reception signal is received based on modulation in which both the real number and imaginary number domains on the complex domain are used. Referring to FIG. 19, the modulation symbol for the parity part transmitted by each UE participating in federated learning is the same as 1620 in FIG. 16. At 1910 in FIG. 19, the receiver (server) receives the reception signal 1911. Thereafter, at 1920 in FIG. 19, the receiver (server) determines a window (or boundary) to be applied from a specific point of the reception signal in order to reduce the search space. Next, at 1930 in FIG. 19, receiver (server) performs probability calculation within the determined window 1931 on it. That is, the receiver (server) performs demodulation on the modulation symbol (or constellation) points within the determined window 1931 and extracts a soft-value for each symbol.

Looking specifically at the process of reducing the constellation hypothesis size for demodulation, the reception signal at the receiver (server) is expressed as r=Ps+n. Here, P means average transmission power through power control and pre-equalization, and n~CN(0,1) or N(0,1) means (complex) Gaussian noise. At this time, the boundary candidate set for determining the reduced hypothesis size can be defined as Equation 10 below. Equation 11 below assumes the case where $Q=q^2$, where $q=p^i$ for $i \in \mathbb{N}$, and p is prime number.

$$\mathbb{B} = \{-Ub, -Ub + (q-1), \dots, -Ub + U(q-1)\} \qquad \text{[Equation 11]}$$

On the complex domain of the receiver, the boundaries of the real number domain and the imaginary number domain can be determined based on Equation 12 and Equation 13 below.

$$\text{real axis: } \left[ maxmin\left(\frac{\text{real}(r[n])}{P}; \mathbb{B}\right), minmax\left(\frac{\text{real}(r[n])}{P}; \mathbb{B}\right) \right] \qquad \text{[Equation 12]}$$

$$\text{[Equation 13]}$$
$$\text{imag axis: }$$
$$\left[ maxmin\left(\frac{\text{imag}(r[n])}{P}; \mathbb{B}\right), minmax\left(\frac{\text{imag}(r[n])}{P}; \mathbb{B}\right) \right]$$

Here, maxmin (a; $\mathbb{B}$) means the largest element among the elements of $\mathbb{B}$ that is not larger than a, and minmax (a; $\mathbb{B}$) means the smallest element among the elements of $\mathbb{B}$ that is not smaller than a.

FIG. 20 is a flowchart illustrating an example of a method for performing federated learning in a wireless communication system proposed in the present disclosure.

More specifically, in a method for performing federated learning for a plurality of user equipments (UEs) in a wireless communication system, one of the plurality of UEs receives, from a base station, restriction information related to an order restriction for an information field for generating a local parameter transmitted by the one UE to perform the federated learning S2010.

Next, the one UE performs encoding on the local parameter generated from an order restricted information field based on the restriction information S2020. Here, the encoded local parameter consists of a systematic bit part and a parity part.

Afterwards, the one UE performs modulation on the encoded local parameter S2030. At this time, the modulation is performed in different ways for each of the systematic bit part and the parity part.

Finally, the one UE transmits, to the base station, a signal including the modulated local parameters (S2040).

Communication System Applied to Present Disclosure

The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be certain in more detail with reference to the drawings. In the following drawings/description, the same reference symbols may denote the same or corresponding hardware blocks, software blocks, or functional blocks unless described otherwise.

FIG. 21 illustrates a communication system applied to the present disclosure.

Referring to FIG. 21, a communication system 1 applied to the present disclosure includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous driving vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

FIG. 22 illustrates wireless devices applicable to the present disclosure.

Referring to FIG. 22, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 21.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document.

FIG. 23 illustrates a signal process circuit for a transmission signal applied to the present disclosure.

Referring to FIG. 23, a signal processing circuit 1000 may include scramblers 1010, modulators 1020, a layer mapper 1030, a precoder 1040, resource mappers 1050, and signal generators 1060. An operation/function of FIG. 23 may be performed, without being limited to, the processors 102 and 202 and/or the transceivers 106 and 206 of FIG. 22. Hardware elements of FIG. 23 may be implemented by the processors 102 and 202 and/or the transceivers 106 and 206 of FIG. 22. For example, blocks 1010 to 1060 may be implemented by the processors 102 and 202 of FIG. 22. Alternatively, the blocks 1010 to 1050 may be implemented by the processors 102 and 202 of FIG. 22 and the block 1060 may be implemented by the transceivers 106 and 206 of FIG. 22.

Codewords may be converted into radio signals via the signal processing circuit 1000 of FIG. 23. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

Specifically, the codewords may be converted into scrambled bit sequences by the scramblers 1010. Scramble sequences used for scrambling may be generated based on an initialization value, and the initialization value may include ID information of a wireless device. The scrambled bit sequences may be modulated to modulation symbol sequences by the modulators 1020. A modulation scheme may include pi/2-Binary Phase Shift Keying (pi/2-BPSK), m-Phase Shift Keying (m-PSK), and m-Quadrature Amplitude Modulation (m-QAM). Complex modulation symbol sequences may be mapped to one or more transport layers by the layer mapper 1030. Modulation symbols of each transport layer may be mapped (precoded) to corresponding antenna port(s) by the precoder 1040. Outputs z of the precoder 1040 may be obtained by multiplying outputs y of the layer mapper 1030 by an N*M precoding matrix W. Herein, N is the number of antenna ports and M is the number of transport layers. The precoder 1040 may perform precoding after performing transform precoding (e.g., DFT) for complex modulation symbols. Alternatively, the precoder 1040 may perform precoding without performing transform precoding.

Signal processing procedures for a signal received in the wireless device may be configured in a reverse manner of the signal processing procedures 1010 to 1060 of FIG. 23.

FIG. 24 illustrates another example of a wireless device applied to the present disclosure. The wireless device may be implemented in various forms according to a use-case/service.

Referring to FIG. 24, wireless devices 100 and 200 may correspond to the wireless devices 100 and 200 of FIG. 20 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 20. For example, the transceiver(s) 114 may include the one or more transceivers 106 and 206 and/or the one or more antennas 108 and 208 of FIG. 20. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100*a* of FIG. 21), the vehicles (100*b*-1 and 100*b*-2 of FIG. 19), the XR device (100*c* of FIG. 21), the hand-held device (100*d* of FIG. 21), the home appliance (100*e* of FIG. 21), the IoT device (100*f* of FIG. 21), a digital broadcast terminal, a hologram device, a public safety device, an MTC device, a medicine device, a fintech device (or a finance device), a security device, a climate/environment device, the AI server/device (400 of FIG. 21), the BSs (200 of FIG. 21), a network node, etc. The wireless device may be used in a mobile or fixed place according to a use-example/service.

Hereinafter, the implementation example of FIG. 24 will be described in more detail with reference to the drawings.

Figure 25:
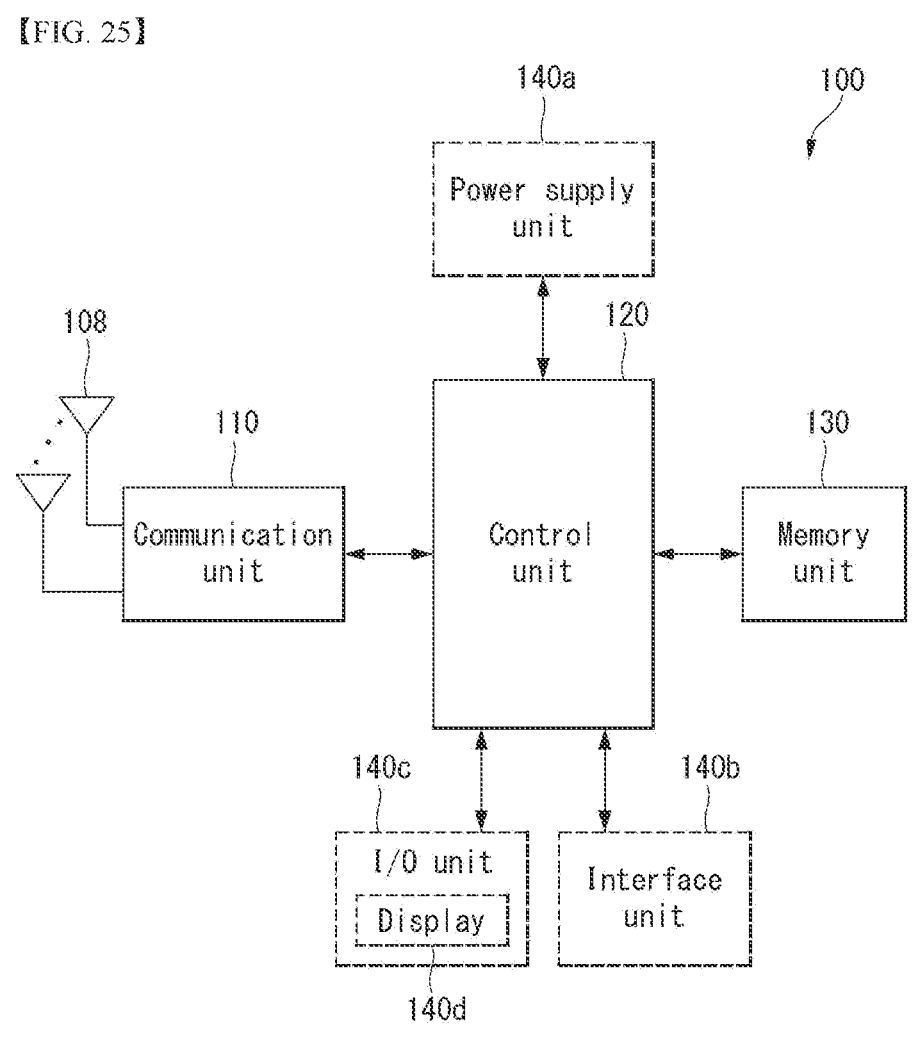

FIG. 25 illustrates a hand-held device applied to the present disclosure.

Referring to FIG. 25, a hand-held device 100 may include an antenna unit 108, a communication unit 110, a control unit 120, a memory unit 130, a power supply unit 140*a*, an interface unit 140*b*, and an I/O unit 140*c*. The antenna unit 108 may be configured as a part of the communication unit 110. Blocks 110 to 130/140*a* to 140*c* correspond to the blocks 110 to 130/140 of FIG. 24, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140*a* may supply power to the hand-held device 100 and include a wired/wireless charging circuit, a battery, etc. The interface unit 140*b* may support connection of the hand-held device 100 to other external devices. The interface unit 140*b* may include various ports (e.g., an audio I/O port and a video I/O port) for connection with external devices. The I/O unit 140*c* may input or output video information/signals, audio information/signals, data, and/or information input by a user. The I/O unit 140*c* may include a camera, a microphone, a user input unit, a display unit 140*d*, a speaker, and/or a haptic module.

FIG. 26 illustrates a vehicle or an autonomous driving vehicle applied to the present invention. The vehicle or autonomous driving vehicle may be implemented by a mobile robot, a car, a train, a manned/unmanned Aerial Vehicle (AV), a ship, etc.

Referring to FIG. 26, a vehicle or autonomous driving vehicle 100 may include an antenna unit 108, a communication unit 110, a control unit 120, a driving unit 140*a*, a power supply unit 140*b*, a sensor unit 140*c*, and an autonomous driving unit 140*d*. The antenna unit 108 may be configured as a part of the communication unit 110. The blocks 110/130/140*a* to 140*d* correspond to the blocks 110/130/140 of FIG. 24, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous driving vehicle 100. The control unit 120 may include an Electronic Control Unit (ECU). The driving unit 140*a* may cause the vehicle or the autonomous driving vehicle 100 to drive on a road. The driving unit 140*a* may include an engine, a motor, a powertrain, a wheel, a brake, a steering device, etc. The power supply unit 140*b* may supply power to the vehicle or the autonomous driving vehicle 100 and include a wired/wireless charging circuit, a battery, etc. The sensor unit 140*c* may acquire a vehicle state, ambient environment information, user information, etc. The sensor unit 140*c* may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140*d* may implement technology for maintaining a lane on which a vehicle is driving, technology for automatically adjusting speed, such as adaptive cruise control, technology for autonomously driving along a determined path, technology for driving by automatically setting a path if a destination is set, and the like.

FIG. 27 illustrates a vehicle applied to the present disclosure. The vehicle may be implemented as a transport means, an aerial vehicle, a ship, etc.

Referring to FIG. 27, a vehicle 100 may include a communication unit 110, a control unit 120, a memory unit 130, an I/O unit 140*a*, and a positioning unit 140*b*. Herein, the blocks 110 to 130/140*a* and 140*b* correspond to blocks 110 to 130/140 of FIG. 24.

The communication unit 110 may transmit and receive signals (e.g., data and control signals) to and from external devices such as other vehicles or BSs. The control unit 120 may perform various operations by controlling constituent elements of the vehicle 100. The memory unit 130 may store data/parameters/programs/code/commands for supporting various functions of the vehicle 100. The I/O unit 140*a* may output an AR/VR object based on information within the memory unit 130. The I/O unit 140*a* may include an HUD. The positioning unit 140*b* may acquire information about the position of the vehicle 100. The position information may include information about an absolute position of the vehicle 100, information about the position of the vehicle 100 within a traveling lane, acceleration information, and information about the position of the vehicle 100 from a neighboring vehicle. The positioning unit 140*b* may include a GPS and various sensors.

FIG. 28 illustrates an XR device applied to the present invention. The XR device may be implemented by an HMD, an HUD mounted in a vehicle, a television, a smartphone, a computer, a wearable device, a home appliance, a digital signage, a vehicle, a robot, etc.

Referring to FIG. 28, an XR device 100*a* may include a communication unit 110, a control unit 120, a memory unit 130, an I/O unit 140*a*, a sensor unit 140*b*, and a power supply unit 140*c*. Herein, the blocks 110 to 130/140*a* to 140*c* correspond to the blocks 110 to 130/140 of FIG. 24, respectively.

The communication unit 110 may transmit and receive signals (e.g., media data and control signals) to and from external devices such as other wireless devices, hand-held devices, or media servers. The media data may include video, images, and sound. The control unit 120 may perform various operations by controlling constituent elements of the XR device 100*a*. For example, the control unit 120 may be configured to control and/or perform procedures such as video/image acquisition, (video/image) encoding, and metadata generation and processing. The memory unit 130 may store data/parameters/programs/code/commands needed to drive the XR device 100*a*/generate XR object. The I/O unit 140*a* may obtain control information and data from the exterior and output the generated XR object. The I/O unit 140*a* may include a camera, a microphone, a user input unit, a display unit, a speaker, and/or a haptic module. The sensor unit 140*b* may obtain an XR device state, surrounding environment information, user information, etc. The sensor unit 140*b* may include a proximity sensor, an illumination sensor, an acceleration sensor, a magnetic sensor, a gyro sensor, an inertial sensor, an RGB sensor, an IR sensor, a fingerprint recognition sensor, an ultrasonic sensor, a light sensor, a microphone and/or a radar. The power supply unit 140*c* may supply power to the XR device 100*a* and include a wired/wireless charging circuit, a battery, etc.

Furthermore, The XR device 100*a* may be wirelessly connected to the hand-held device 100*b* through the communication unit 110 and the operation of the XR device 100*a* may be controlled by the hand-held device 100*b*. For example, the hand-held device 100*b* may operate as a controller of the XR device 100*a*. To this end, the XR device 100*a* may obtain information about a 3D position of the hand-held device 100*b* and generate and output an XR object corresponding to the hand-held device 100*b*.

FIG. 29 illustrates a robot applied to the present invention. The robot may be categorized into an industrial robot, a medical robot, a household robot, a military robot, etc., according to a used purpose or field.

Referring to FIG. 29, a robot 100 may include a communication unit 110, a control unit 120, a memory unit 130, an I/O unit 140*a*, a sensor unit 140*b*, and a driving unit 140*c*. Herein, the blocks 110 to 130/140*a* to 140*c* correspond to the blocks 110 to 130/140 of FIG. 24, respectively.

The communication unit 110 may transmit and receive signals (e.g., driving information and control signals) to and from external devices such as other wireless devices, other robots, or control servers. The control unit 120 may perform various operations by controlling constituent elements of the robot 100. The memory unit 130 may store data/parameters/ programs/code/commands for supporting various functions of the robot 100. The I/O unit 140*a* may obtain information from the exterior of the robot 100 and output information to the exterior of the robot 100. The I/O unit 140*a* may include a camera, a microphone, a user input unit, a display unit, a speaker, and/or a haptic module. The sensor unit 140*b* may obtain internal information of the robot 100, surrounding environment information, user information, etc. The sensor unit 140*b* may include a proximity sensor, an illumination sensor, an acceleration sensor, a magnetic sensor, a gyro sensor, an inertial sensor, an IR sensor, a fingerprint recognition sensor, an ultrasonic sensor, a light sensor, a microphone, a radar, etc. The driving unit 140*c* may perform various physical operations such as movement of robot joints. In addition, the driving unit 140*c* may cause the robot 100 to travel on the road or to fly. The driving unit 140*c* may include an actuator, a motor, a wheel, a brake, a propeller, etc.

FIG. 30 illustrates an AI device applied to the present invention. The AI device may be implemented by a fixed device or a mobile device, such as a TV, a projector, a smartphone, a PC, a notebook, a digital broadcast terminal, a tablet PC, a wearable device, a Set Top Box (STB), a radio, a washing machine, a refrigerator, a digital signage, a robot, a vehicle, etc.

Referring to FIG. 30, an AI device 100 may include a communication unit 110, a control unit 120, a memory unit 130, an I/O unit 140*a*/140*b*, a learning processor unit 140*c*, and a sensor unit 140*d*. The blocks 110 to 130/140*a* to 140*d* correspond to blocks 110 to 130/140 of FIG. 24, respectively.

The communication unit 110 may transmit and receive wired/radio signals (e.g., sensor information, user input, learning models, or control signals) to and from external devices such as other AI devices (e.g., 100*x*, 200, or 400 of FIG. W1) or an AI server (e.g., 400 of FIG. W1) using wired/wireless communication technology. To this end, the communication unit 110 may transmit information within the memory unit 130 to an external device and transmit a signal received from the external device to the memory unit 130.

The control unit 120 may determine at least one feasible operation of the AI device 100, based on information which is determined or generated using a data analysis algorithm or a machine learning algorithm. The control unit 120 may perform an operation determined by controlling constituent elements of the AI device 100.

The memory unit 130 may store data for supporting various functions of the AI device 100.

The input unit 140*a* may acquire various types of data from the exterior of the AI device 100. For example, the input unit 140*a* may acquire learning data for model learning, and input data to which the learning model is to be applied. The input unit 140*a* may include a camera, a microphone, and/or a user input unit. The output unit 140*b* may generate output related to a visual, auditory, or tactile sense. The output unit 140*b* may include a display unit, a speaker, and/or a haptic module. The sensing unit 140 may obtain at least one of internal information of the AI device 100, surrounding environment information of the AI device 100, and user information, using various sensors. The sensor unit 140 may include a proximity sensor, an illumination sensor, an acceleration sensor, a magnetic sensor, a gyro sensor, an inertial sensor, an RGB sensor, an IR sensor, a fingerprint recognition sensor, an ultrasonic sensor, a light sensor, a microphone, and/or a radar.

The learning processor unit 140*c* may learn a model consisting of artificial neural networks, using learning data. The learning processor unit 140*c* may perform AI processing together with the learning processor unit of the AI server (400 of FIG. W1). The learning processor unit 140*c* may process information received from an external device through the communication unit 110 and/or information stored in the memory unit 130. In addition, an output value of the learning processor unit 140*c* may be transmitted to the external device through the communication unit 110 and may be stored in the memory unit 130.

In the aforementioned embodiments, the elements and characteristics of the present disclosure have been combined in a specific form. Each of the elements or characteristics may be considered to be optional unless otherwise described explicitly. Each of the elements or characteristics may be implemented in a form to be not combined with other elements or characteristics. Furthermore, some of the elements or the characteristics may be combined to form an embodiment of the present disclosure. The sequence of the operations described in the embodiments of the present disclosure may be changed. Some of the elements or characteristics of an embodiment may be included in another embodiment or may be replaced with corresponding elements or characteristics of another embodiment. It is evident that an embodiment may be constructed by combining claims not having an explicit citation relation in the claims or may be included as a new claim by amendments after filing an application.

The embodiment according to the present disclosure may be implemented by various means, for example, hardware, firmware, software or a combination of them. In the case of an implementation by hardware, the embodiment of the present disclosure may be implemented using one or more application-specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In the case of an implementation by firmware or software, the embodiment of the present disclosure may be implemented in the form of a module, procedure or function for performing the aforementioned functions or operations. Software code may be stored in the memory and driven by the processor. The memory may be located inside or outside the processor and may exchange data with the processor through a variety of known means.

It is evident to those skilled in the art that the present disclosure may be materialized in other specific forms without departing from the essential characteristics of the present disclosure. Accordingly, the detailed description should not be construed as being limitative from all aspects, but should be construed as being illustrative. The scope of the present disclosure should be determined by reasonable analysis of the attached claims, and all changes within the equivalent range of the present disclosure are included in the scope of the present disclosure.

INDUSTRIAL APPLICABILITY

The present disclosure has been described focusing on examples applied to 3GPP LTE/LTE-A and 5G systems, but it can be applied to various wireless communication systems in addition to the 3GPP LTE/LTE-A and 5G systems.

The invention claimed is:

1. A method for performing federated learning by a plurality of user equipments (UEs) in a wireless communication system, the method performed by one of the plurality of UEs comprising:

receiving, from a base station, restriction information related to an order restriction for an information field for generating a local parameter transmitted by the one UE to perform the federated learning;

performing encoding on the local parameter generated from an order restricted information field based on the restriction information, wherein the encoded local parameter consists of a systematic bit part and a parity part;

performing modulation on the encoded local parameter, wherein the modulation is performed in different ways for each of the systematic bit part and the parity part; and transmitting, to the base station, a signal including the modulated local parameters.

2. The method of claim 1, wherein the way of the modulation is determined based on whether an order value of the information field is (i) a prime number or (ii) the prime number to the power of 2n, and the n is a natural number.

3. The method of claim 2, wherein, based on the order value of the information field being the prime number, the modulation is performed based only on a real number domain among the real number domain and an imaginary number domain on a complex domain in which the modulation is performed.

4. The method of claim 3, wherein the modulation is performed by applying differently a modulation offset value used for the modulation to the systematic bit part and the parity part.

5. The method of claim 4, wherein the modulation offset value for the systematic bit part is determined based on an order value of the order restricted information field, and the modulation offset value for the parity part is determined based on the order value of the information field.

6. The method of claim 5, wherein the modulation offset value for the systematic bit part and the modulation offset value for the parity part are determined based on equation below, $$
b = \begin{cases} \dfrac{\sum_{i=0}^{Q-1} i}{Q}, & \text{if parity part,} \\ \dfrac{\sum_{i=0}^{Q_1-1} i}{Q_1}, & \text{if systematic bit part.} \end{cases}
\qquad \text{[Equation]}
$$

where, b is the modulation offset value, Q is the order value of the information field, and Q1 is the order value of the order restricted information field.

7. The method of claim 2, wherein, based on the order value of the information field being the prime number, the modulation is performed based on both a real number domain and an imaginary number domain on a complex domain in which the modulation is performed.

8. The method of claim 7, wherein the modulation applies differently a modulation offset value used for the modulation to the systematic bit part and the parity part, and is performed by applying differently (i) a way in which a modulation symbol for the systematic bit part is mapped onto the complex domain, and (ii) a way in which a modulation symbol for the parity part is mapped onto the complex domain.

9. The method of claim 8, wherein the modulation offset value for the systematic bit part is determined based on an order value of the order restricted information field, the modulation offset value for the parity part is determined based on the order value of the information field, the way in which the modulation symbol for the systematic bit part is mapped onto the complex domain is determined based on the order value of the order restricted information field, and the way in which the modulation symbol for the parity part is mapped onto the complex domain is determined based on the order value of the information field.

10. The method of claim 9, wherein the modulation offset value for the systematic bit part and the modulation offset value for the parity part are determined based on equation below, $$
b = \begin{cases} \dfrac{\sum_{i=0}^{\lceil \sqrt{Q} \rceil - 1} i}{\lceil \sqrt{Q} \rceil}, & \text{if parity part,} \\ \dfrac{\sum_{i=0}^{\lceil \sqrt{Q_1} \rceil - 1} i}{\lceil \sqrt{Q_1} \rceil}, & \text{if systematic bit part} \end{cases}
\qquad \text{[Equation]}
$$

where, b is the modulation offset value, Q is the order value of the information field, Q1 is the order value of the order restricted information field, and $\lceil \ \rceil$ is a ceiling function.

11. The method of claim 10, wherein the way in which the modulation symbol for the systematic bit part and the modulation symbol for the parity part are mapped onto the real number domain is determined based on equation below, $$t_{u,0} = \begin{cases} \dfrac{c_u[n]}{\lceil \sqrt{Q} \rceil}, & \text{if parity part,} \\ \dfrac{c_u[n]}{\lceil \sqrt{Q_1} \rceil}, & \text{if systematic bit part} \end{cases} \qquad \text{[Equation]}$$

the way in which the modulation symbol for the systematic bit part and the modulation symbol for the parity part are mapped onto the imaginary number domain is determined based on equation below, $$t_{u,1}[n] = \begin{cases} (c_u[n])_{\lceil \sqrt{Q} \rceil}, & \text{if parity part,} \\ (c_u[n])_{\lceil \sqrt{Q_1} \rceil}, & \text{if systematic bit part} \end{cases} \qquad \text{[Equation]}$$

in the above equations, $c_u[n]$ is a codeword of a specific UE whose UE index is u among the plurality of UEs to which a UE index is assigned, $t_{u,0}[n]$ is a value on the real number domain of the modulation symbol for the $c_u[n]$, Q is the order value of the information field, and Q1 is the order value of the order restricted information field, and $\lceil \; \rceil$ is the ceiling function, $$(c_u[n])_{\lceil \sqrt{Q_1} \rceil}$$

is a modulo operation of the $c_u[n]$ with $\lceil \sqrt{Q} \rceil$, and $$(c_u[n])_{\lceil \sqrt{Q_1} \rceil}$$

is a modulo operation of the $c_u[n]$ with $\lceil \sqrt{Q_1} \rceil$.

12. The method of claim 2, wherein, based on the order value of the information field being the prime number to the power of 2n, the modulation is performed based on both a real number domain and an imaginary number domain on a complex domain in which the modulation is performed.

13. The method of claim 12, wherein the modulation is performed by applying differently a modulation offset value used for the modulation to the systematic bit part and the parity part.

14. The method of claim 13, wherein the modulation offset value for the systematic bit part and the modulation offset value for the parity part are determined based on equation below, $$b = \begin{cases} \dfrac{\sum_{i=0}^{Q-1} i}{q}, & \text{if parity part,} \\ \dfrac{\sum_{i=0}^{Q^*-1} i}{Q^*}, & \text{if systematic bit part.} \end{cases} \qquad \text{[Equation]}$$

where, b is the modulation offset value, q is a number corresponding to the prime number to the power of n, and Q* is the order value of the information field available to the one UE.

15. A user equipment (UE) for performing federated learning with a plurality of user equipments (UEs) in a wireless communication system, the UE comprising:
a transmitter configured to transmit a wireless signal;
a receiver configured to receive a wireless signal;
at least one processor; and
at least one computer memory operably connected to the at least one processor, and storing instructions for performing operations when on being executed by the at least one processor,
wherein the operations includes:
receiving, from a base station, restriction information related to an order restriction for an information field for generating a local parameter transmitted by the one UE to perform the federated learning;
performing encoding on the local parameter generated from an order restricted information field based on the restriction information,
wherein the encoded local parameter consists of a systematic bit part and a parity part;
performing modulation on the encoded local parameter,
wherein the modulation is performed in different ways for each of the systematic bit part and the parity part; and
transmitting, to the base station, a signal including the modulated local parameters.

16. A method for performing federated learning by a base station with a plurality of user equipments (UEs) in a wireless communication system, the method comprising:
transmitting, to the plurality of UEs, restriction information related to an order restriction for an information field for generating a local parameter transmitted by the plurality of UEs to perform the federated learning; and
receiving a signal including the local parameter from the plurality of UEs,
wherein the local parameter is generated and encoded from an order restricted information field based on the restriction information,
wherein the encoded local parameter consists of a systematic bit part and a parity part, and
wherein each of the systematic bit part and the parity part of the encoded local parameter is modulated in a different way.

* * * * *